United States Patent
Lee

(10) Patent No.: US 6,307,555 B1
(45) Date of Patent: Oct. 23, 2001

(54) BOOLEAN OPERATIONS FOR SUBDIVISION SURFACES

(75) Inventor: Eugene T. Y. Lee, Renton, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/164,089

(22) Filed: Sep. 30, 1998

(51) Int. Cl.[7] ............................................. G09G 15/00
(52) U.S. Cl. ..................... 345/423; 345/423; 345/421; 345/430; 345/441
(58) Field of Search ................................ 345/419, 420, 345/421, 422, 423, 424, 425, 426, 427, 429, 430, 428, 440, 441, 435, 433; G06F 15/00

(56) References Cited

U.S. PATENT DOCUMENTS

| | | | |
|---|---|---|---|
| 4,999,789 | * 3/1991 | Fiasconaro | 345/434 |
| 5,416,729 | * 5/1995 | Leon | 345/420 |
| 5,602,979 | * 2/1997 | Loop | 345/441 |
| 5,703,782 | * 12/1997 | Dunforf | 364/474.24 |
| 5,825,369 | * 10/1998 | Rossignac | 345/440 |
| 5,886,702 | * 3/1999 | Migdal | 345/423 |
| 5,889,524 | * 3/1999 | Sheehan | 345/419 |
| 5,905,507 | * 5/1999 | Rossignac | 345/440 |
| 5,929,860 | * 7/1999 | Hoppe | 345/419 |
| 5,945,996 | * 8/1999 | Migdal | 345/420 |
| 5,963,209 | * 10/1999 | Hoppe | 345/419 |
| 5,977,987 | * 11/1999 | Duluk | 345/441 |
| 6,016,153 | * 1/2000 | Gueziec | 345/441 |
| 6,031,548 | * 2/2000 | Gueziec | 345/440 |
| 6,037,949 | * 3/2000 | DeRose | 345/430 |
| 6,046,744 | * 4/2000 | Hoppe | 345/419 |
| 6,078,331 | * 6/2000 | Pulli | 345/423 |
| 6,172,679 | * 1/2001 | Lim | 345/422 |
| 6,191,787 | * 2/2001 | Lu | 345/418 |

OTHER PUBLICATIONS

Beier, Thaddeus et al.; "Feature–Based Image Metamorhphosis"; *Computer Graphics*; Jul. 1992.

Fadel, Georges M. et al.; "Accuracy Issues in CAD to RP Translations"; 1995; Clemson, SC; http://www.mcb.co.uk/services/conferen/dec95/rapidpd/fadel/fadel.htm.

Ganter, M.A. et al.; "Implicit Solid Modeling: A Renewed Method for Geometric Design"; *Innovations in Engineering Design Education Resource Guide*; 1993; http://swhite.me-.washington.edu/~cdam/ISMASMe/ismasme.html.

Halstead, Mark et al.; "Efficient, Fair Interpolation Using Catmull–Clark Surfaces"; Computer Graphics Proceedings, Annual Conference Series; 1993.

Hoppe, Huges et al; "Piecewise Smooth Surface Reconstruction"; Computer Graphics Proceedings, Annual Conference Series; 1994.

Jara, Fredy; "About Solid Modeling by Using Feature–Based Models"; 1996; http://www.cs.uml.edu/~fjara/review3.html.

Seitz, Steven M. et al.; "View Morphing".

"Avid Elastic Reality for Power Macintosh, Windos, and SGI Workstations"; Avid Technology, Inc.; 1997–1998.

* cited by examiner

Primary Examiner—Matthew Luu
Assistant Examiner—Wesner Sajous
(74) Attorney, Agent, or Firm—Staas & Halsey LLP

(57) ABSTRACT

A method for creating a new subdivision surface from one or more prior subdivision surfaces using a computer, the computer having a processor and a memory, includes establishing in the memory a data structure storing data representing the structures of the prior subdivision surfaces, performing Boolean operations upon prior meshes defining the one or more prior subdivision surfaces to form a resulting mesh defining the new subdivision surface, and storing the resulting mesh in the memory.

16 Claims, 34 Drawing Sheets

BOOLEAN OPERATIONS FOR SUBDIVISION SURFACES

BACKGROUND

This invention relates to Boolean operations for subdivision surfaces.

Computer modeling of surfaces finds use in a number of disciplines, from automotive design to fine art. A number of methods for constructing surfaces, especially smoothly-varying surfaces, have been developed. One example is NURBS surfaces constructed from piecewise polynomial representations. Recently, another method has been developed to construct complex surfaces. Subdivision surface methods allow for constructing any arbitrary surface (e.g., a human face, or a complex, yet smoothly-varying automobile surface) from a number of polygonal "faces".

Subdivision surfaces comprise a significant generalization of the tensor product B-spline surfaces (or the slightly more general NURBS surfaces) which have been widely used in computer aided geometric modeling, as described above. With tensor product surfaces, the control vertices generally require a rectangularly gridded structure, where each interior vertex is connected to four neighboring vertices ("valance=4"). This can place serious restrictions on the designer. (For instance, closed surfaces can require special handling.) One advantage of subdivision surfaces (over NURBS surfaces) is that subdivision surfaces allow control meshes of arbitrary topology. Thus the vertices can have different valences and the faces of the control mesh need not be four sided.

A subdivision surface is generally defined in the following way. One starts with a base polygonal mesh (a set of control vertices together with their corresponding connectivity structure) $M_0$. A subdivision scheme (consisting of a small number of rules) is applied to yield a refined new mesh $M_1$, which can be called a derived mesh. (New vertices are introduced, and each old face is thereby replaced by several new smaller ones.) This is repeated recursively to give derived meshes $M_n$, n=2, 3, . . . , with progressively denser vertices, as in FIGS. 1A through 1D. It can be proved that these polygonal meshes will converge to a limit surface S. This limit surface is called a subdivision surface.

The subdivision rules are adapted from the corresponding rules which hold for B-splines. Hence the tensor product B-spline surfaces form a subclass of subdivision surfaces. Subdivision surfaces were introduced in 1978 by Doo-Sabin (generalizing bi-quadratic splines) and Catmull-Clark (generalizing bi-cubic splines). In the Catmull-Clark scheme, after one subdivision step, (i.e., from $M_1$ onwards) all faces are quadrilaterals. A different type of subdivision scheme introduced by Loop uses triangular meshes (i.e., meshes with only triangular faces).

Since the subdivision rules for refining meshes are fixed, the final surface S is uniquely determined by the initial mesh $M_0$. Thus S can be stored compactly as $M_0$ (or as any $M_n$ since each $M_n$ can be regarded as the base mesh for the same final surface.) The surface S can be modified by simply modifying the control vertices in the base mesh (or in any intermediate mesh $M_n$, again treated as the new base mesh). One editing system for interactively modifying subdivision surfaces locally by moving selected mesh vertices, is shown in U.S. patent application, Ser. No. 08/839,349, entitled "Editing a Surface", incorporated by reference.

Since S is the limit of $M_n$, to render the subdivision surface, one can usually and simply render an intermediate mesh $M_n$ at some appropriately large n. Alternatively, one can render S by evaluating the limit surface (points and normals) exactly. One method for evaluating S in this manner is shown in U.S. patent application, Ser. No. 09/116,553, filed Jul. 15, 1998, entitled "Surface Evaluation", incorporated by reference.

One problem with subdivision surfaces is that the base mesh for a complex surface may be difficult or time-consuming to construct. Mesh data for a real surface may be obtained from measurement or scanning of an existing object. This generally results in a rather dense mesh. Moreover, since subdivision does not generally interpolate mesh vertices, the limit surface may not reproduce the original real surface. In free form design, mesh data may be painstakingly entered by a designer and modified later. Modifying a large number of vertices in some intermediate mesh $M_n$ can prove time-consuming.

SUMMARY

In general, in a first aspect, the invention features a method for creating a new subdivision surface from one or more prior subdivision surfaces using a computer, the computer having a processor and a memory, the method including establishing in the memory a data structure storing data representing the structures of the prior subdivision surfaces, performing Boolean operations upon prior meshes defining the one or more prior subdivision surfaces to form a resulting mesh defining the new subdivision surface, and storing the resulting mesh in the memory.

Embodiments of the invention may include one or more of the following features. The Boolean operations may include a subtraction operation wherein a portion of one of the prior meshes is deleted. The portion that is deleted may be on one side of an intersection curve formed by the intersection of two or more of the prior meshes. The Boolean operations may include a join operation wherein at least a portion of one of the prior meshes is joined with at least a portion of another of the prior meshes. The subtraction operation may further include determining an intersection between at least two prior meshes, the intersection defining an intersection curve, tessellating faces of the prior meshes incident to the intersection curve, selecting surviving portions of the prior meshes using the intersection curve, and deleting faces of the prior meshes according to the selected surviving portions. The Boolean operations may further include a join operation including combining remaining faces of the prior meshes into a new combined mesh.

In general, in another aspect, the invention features a method for performing Boolean operations upon two base meshes using a computer, where each base mesh comprises a plurality of faces, the computer having a processor and a memory, the method including establishing in the memory a data structure storing data representing the structures of the two base meshes, determining intersections of the two base meshes, the intersections defining an intersection curve, tessellating faces incident to the intersection curve, selecting surviving portions of the intersecting faces, deleting faces of the two base meshes according to the selected surviving portions, and combining remaining faces of the two base meshes into a resultant base mesh.

Embodiments of the invention may include one or more of the following features. Selecting the surviving portions of the two base meshes may be by user input through an input device of the computer, or be automatically calculated by the processor. Tessellating the faces of the base meshes incident to the intersection curve may convert any face having greater than three sides into two or more new faces having only three sides, or convert any face having a number of sides different from four into two or more new faces having only four sides. A surface may be constructed from the resultant base mesh, and the surface may be constructed using subdivision rules. A plurality of intersections between intersecting faces of the two base meshes may be computed, the plurality of intersections defining a plurality of intersection curves.

In general, in another aspect, the invention features a computer program, residing on a computer-readable medium, comprising instructions for creating a new subdivision surface from one or more prior subdivision surfaces by causing a computer to establish in a memory of the computer a data structure storing data representing the structures of the prior subdivision surfaces, perform Boolean operations upon prior meshes defining the one or more prior subdivision surfaces to form a resulting mesh defining the new subdivision surface, and store the resulting mesh in the memory.

In general, in another aspect, the invention features a computer program, residing on a computer-readable medium, comprising instructions for performing Boolean operations upon two base meshes by causing a computer to establish in the memory a data structure storing data representing the structures of the two base meshes, determine intersections of the two base meshes, the intersections defining an intersection curve, tessellate faces incident to the intersection curve, select surviving portions of the intersecting faces, delete faces of the two base meshes according to the selected surviving portions; and combine remaining faces of the two base meshes into a resultant base mesh.

Advantages of the invention may include one or more of the following. Modelers can readily form more complex surfaces out of the meshes for basic subdivision surfaces. Modelers can assemble libraries of basic objects for reuse as components of new designs. Intuitive Boolean operations can be adapted to combine existing subdivision surfaces. Exact mathematical representations of constituent surfaces are not required to generate their Boolean combinations. The resulting subdivision surface is defined by the resulting mesh (with its corresponding subdivision rules), achieving data reduction in storage. Thus the modeler can develop and maintain a library of basic objects for reuse as components of new designs. The user can freely experiment with the positioning of the base meshes to obtain various smooth blendings of the original surfaces.

Other features and advantages of the invention will become apparent from the following description and from the claims.

DRAWINGS

DESCRIPTION

Figure 1A:
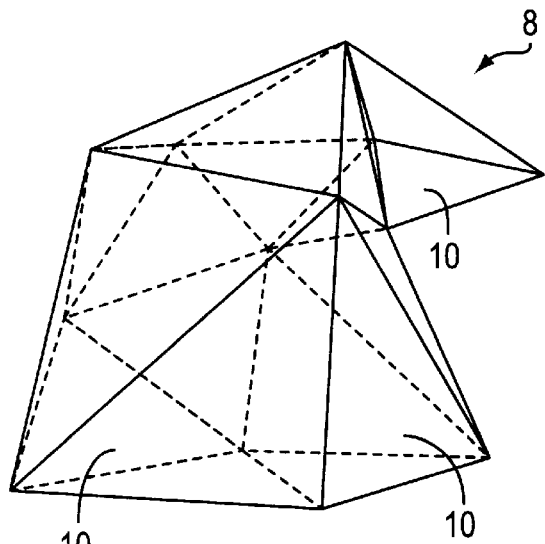
FIGS. 1A through 1D are an initial mesh and successive meshes for a subdivision surface model of an object.
Figure 1B:
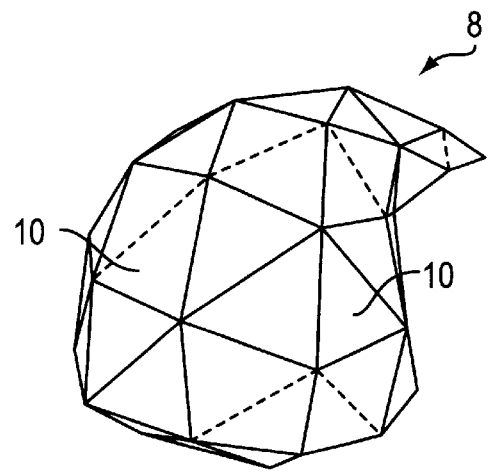
Figure 1C:
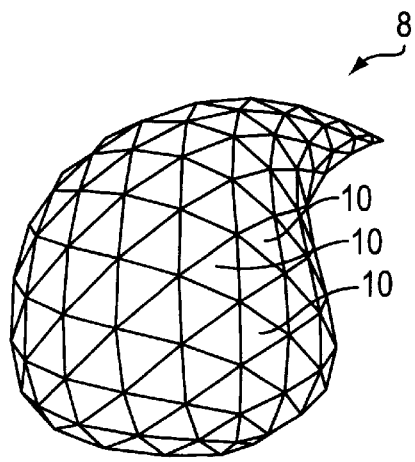
Figure 1D:
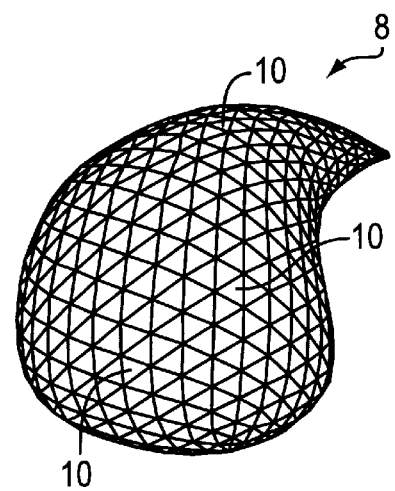

The present invention provides a method for combining simpler meshes for already constructed subdivision surfaces in different ways to create more complex surfaces. The methods of the invention allow for simpler meshes to be combined in ways reminiscent of Boolean operations in Constructive Solid Geometry (CSG), where more complex solids are formed from simple elemental solids (such as cubes, spheres, cylinders) through the Boolean operations (such as intersection, union, subtraction). It should be emphasized that the term "Boolean operations" as used with respect to the present invention has a different (but similar) meaning than as used in CSG. For example, in CSG, the intersection of two solids is generally a solid. As explained further below, with respect to the present invention, the intersection of two surfaces is generally a space curve. Similarly subtraction in the present invention results in trimming a surface, and the analog of union in CSG is the joining of two trimmed surfaces along their intersection.

The present invention does not intersect the exact surfaces $S^1$ and $S^2$ to yield a final combined surface. Rather, the two base meshes $M_o^1$ and $M_o^2$ (which correspond to $S^1$ and $S^2$) are intersected. Preferably, derived meshes $M_n^1$ and $M_k^2$ can be used, after a couple of refinements, in case $M_o^1$ and $M_o^2$ are too sparse. Therefore, Boolean operations can be performed on the meshes (more precisely, on the polyhedral surfaces defined by the meshes). If a Boolean operation (such as join) on $S^1$ and $S^2$ results in a resultant surface S, and the same Boolean operation on $M_o^1$ and $M_o^2$ results in a mesh M, then the subdivision scheme applied to M should converge to a subdivision surface S' which should approximate S very well (especially if the base meshes used for the Boolean operations are derived meshes $M_n^1$ and $M_k^2$ after a couple of refinements). Subdivision rules are all "local", that is, the location of each new vertex depends only on a small number of neighboring old vertices; hence, away from the common intersection, the new surface resulting from M should be the same as the surfaces resulting from the prior base meshes $M_n^1$ and $M_k^2$. Near the intersection curve, S' is a smooth blending of $S^1$ and $S^2$. There are also additional subdivision rules (see, Hoppe, Hugues, et al., "Piecewise Smooth Surface Reconstruction", Computer Graphics Proceedings, Siggraph (1994)) which can be applied locally to edges (e.g., at the polygonal intersection curves) so that in the final surface S' the sharpness of the intersection is maintained.

The ability to freely combine simpler base meshes into more complex resultant meshes (yielding correspondingly more complicated resultant surfaces) provides a very useful tool for free-form design.

Even though the idea of reducing Boolean operations on base meshes to the same operations on their base meshes is valid for any kind of meshes, non-triangular meshes can pose a problem for defining their intersections. Strictly, a base mesh that is not triangular does not in general define a polyhedral surface, since its "faces" are not in general planar. Thus the intersection between these non-planar "faces" is not well defined, in the absence of additional information on the surface spanned by the edges of each such "face". In practice, however, the boundary of each "face" is generally not too twisted. So each "face" can be approximated by triangulating it into triangles. This can be done in at least two ways, and the limiting surface would be expected to be somewhat different depending on how one chooses the triangulation. Again, the eventual limiting surfaces should provide close approximation of each other, under the assumption of near planarity of the "faces".

When the base mesh is quadrilateral (as obtained through one subdivision step of the Catmull-Clark scheme), then for each "face", one may choose one triangulation over the other if the angle between the normals of the resulting two triangles is smaller.

Thus the methods described below will be based on triangular base meshes. This allows a simple data structure, and will significantly simplify the intersection computations. The output M of the Boolean operations will also be a triangular mesh. This directly fits in with the Loop subdivision scheme, for which the input mesh M must be triangular. But the method can also be used in conjunction with the other subdivision schemes, by simply performing initial triangulations on the base meshes, since these two schemes apply to any kind of meshes. The Boolean operations are then performed on the triangulated base meshes, and the subdivision schemes are applied to the resulting mesh, even though the derived meshes will not be triangular.

Figure 2:
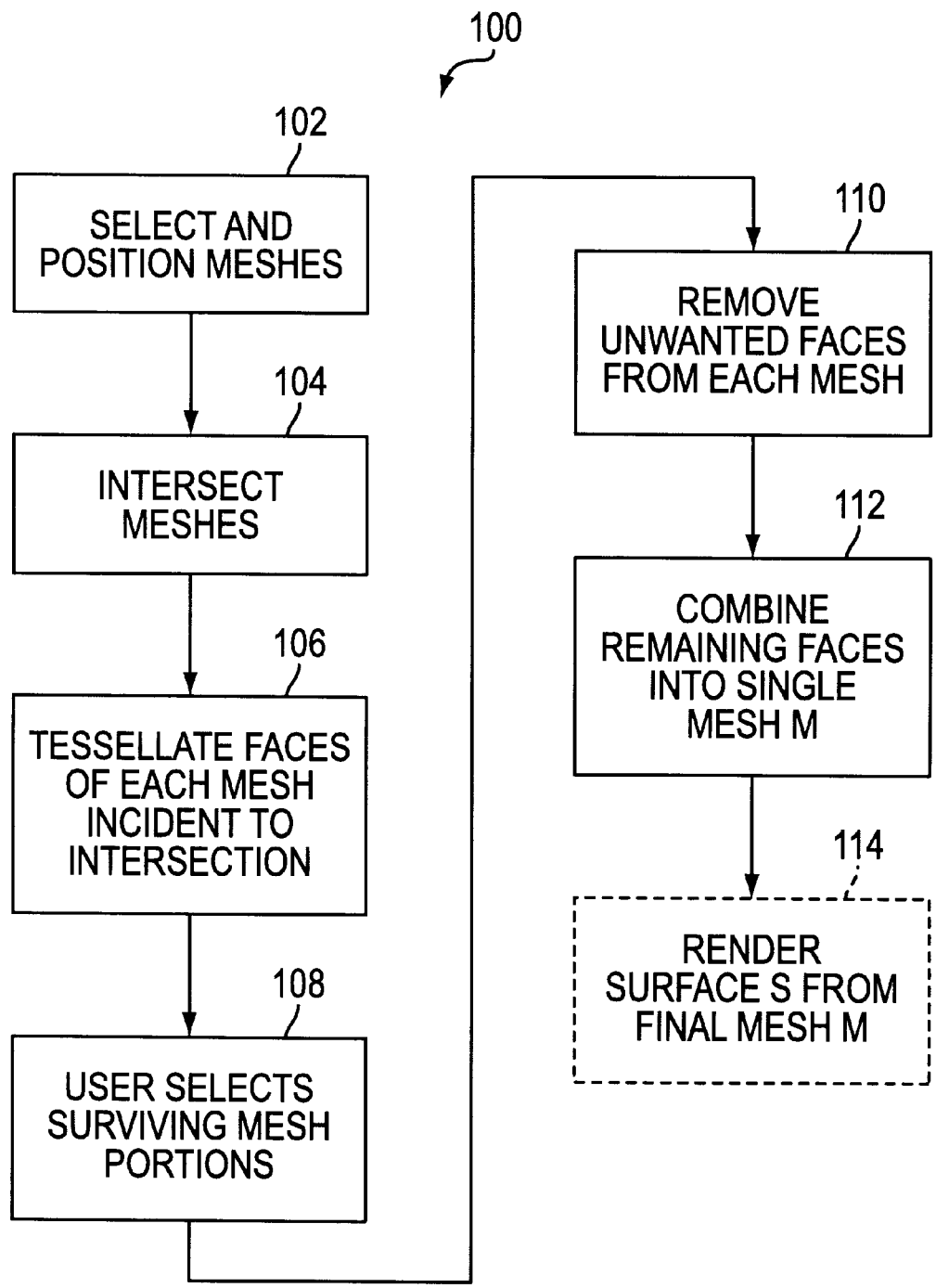
FIG. 2 is a flowchart for Boolean operations for subdivision surfaces.
Figure 3:
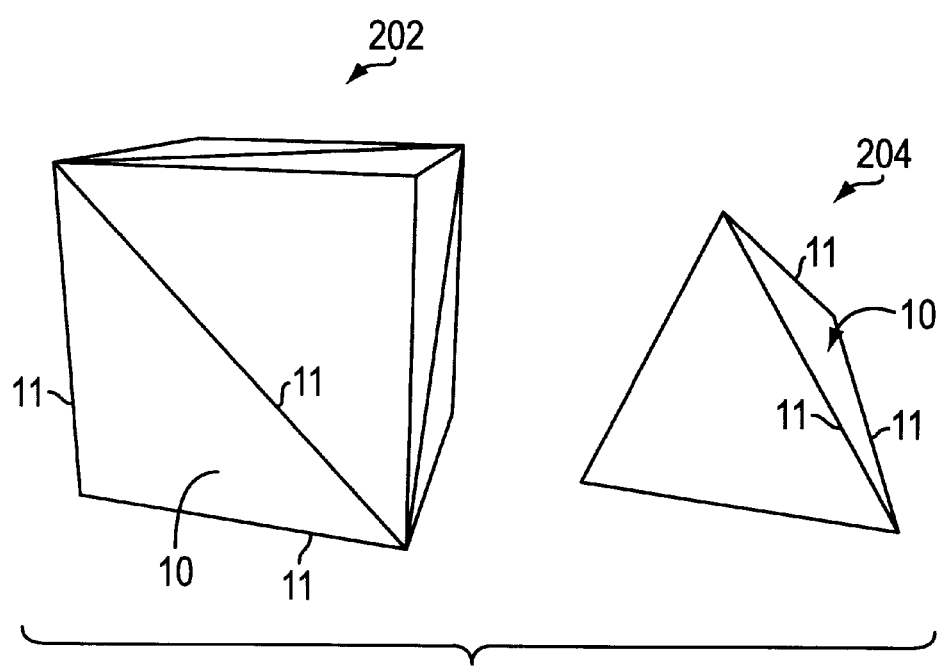
FIG. 3 is a relief representation of two base meshes for subdivision surfaces.

Referring to FIG. 2, a method 100 of performing Boolean operations on base meshes typically begins with the selection and positioning of the meshes (step 102). Referring to FIG. 3, two base meshes 202 and 204 are polyhedral (here, triangular) representations of surfaces of a cube and pyramid respectively. The surfaces are constructed with triangular faces 10 having edges 11 (for clarity, one representative face 10 is shown labeled in each mesh). The cube and pyramid represented by base meshes 202 and 204 are used below to demonstrate method 100. However, these are simple cases used merely for ease of demonstration; method 100 can be applied to join much more complex shapes. Indeed, method 100 as described further below provides a superior means for handling difficult intersections between complicated surfaces.

Figure 4A:
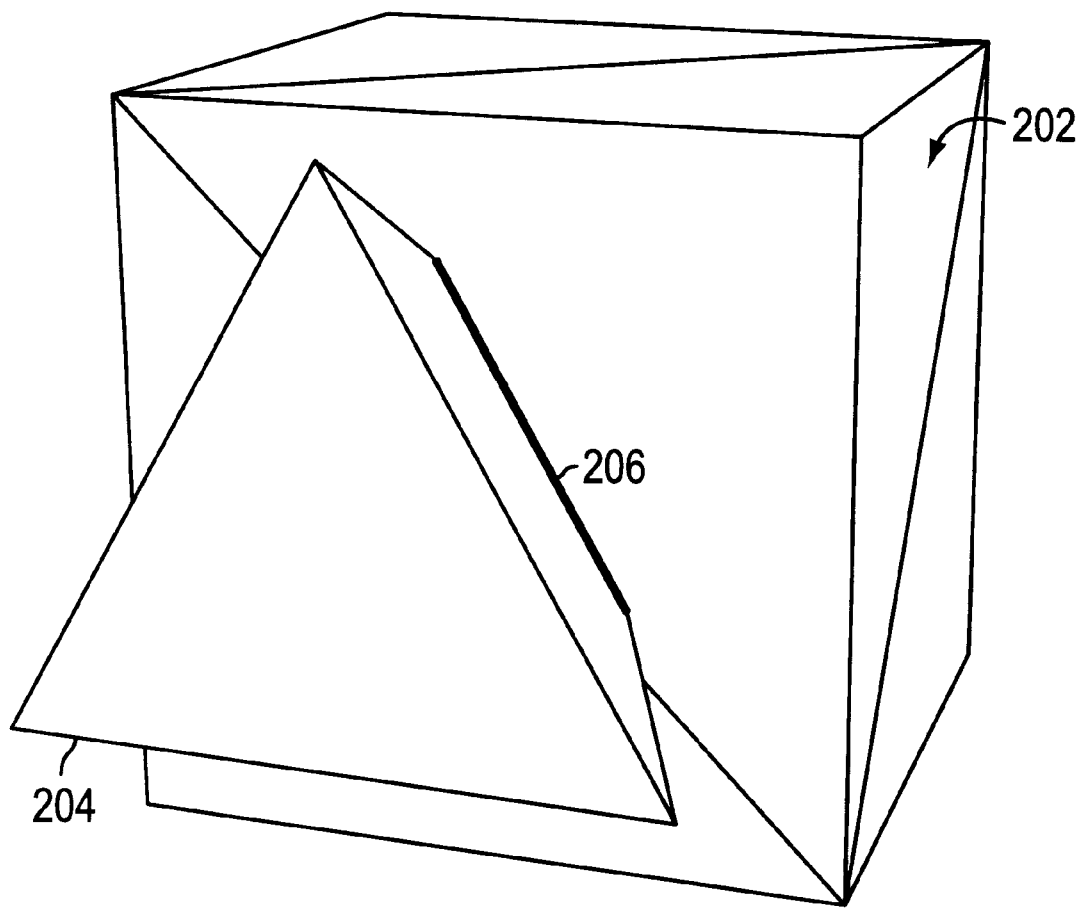
FIGS. 4A and 4B are relief representations of an intersection between the two base meshes of FIG. 3.
Figure 4B:
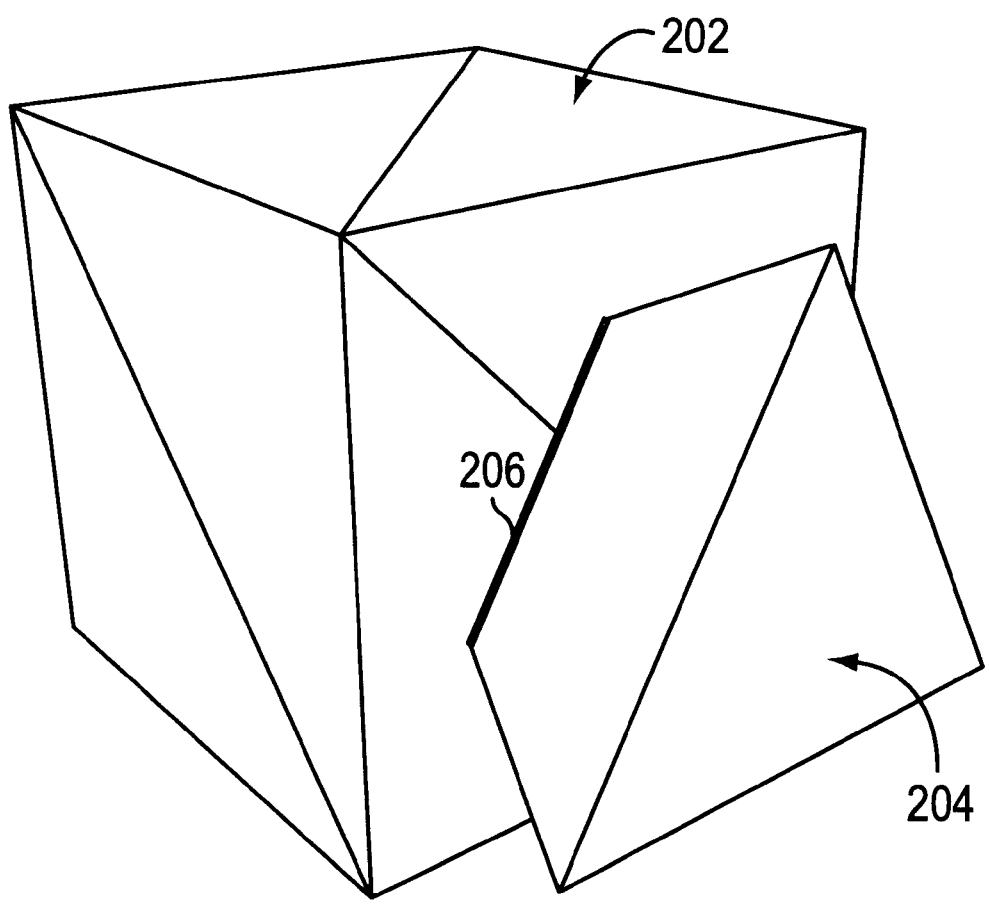
Figure 5A:
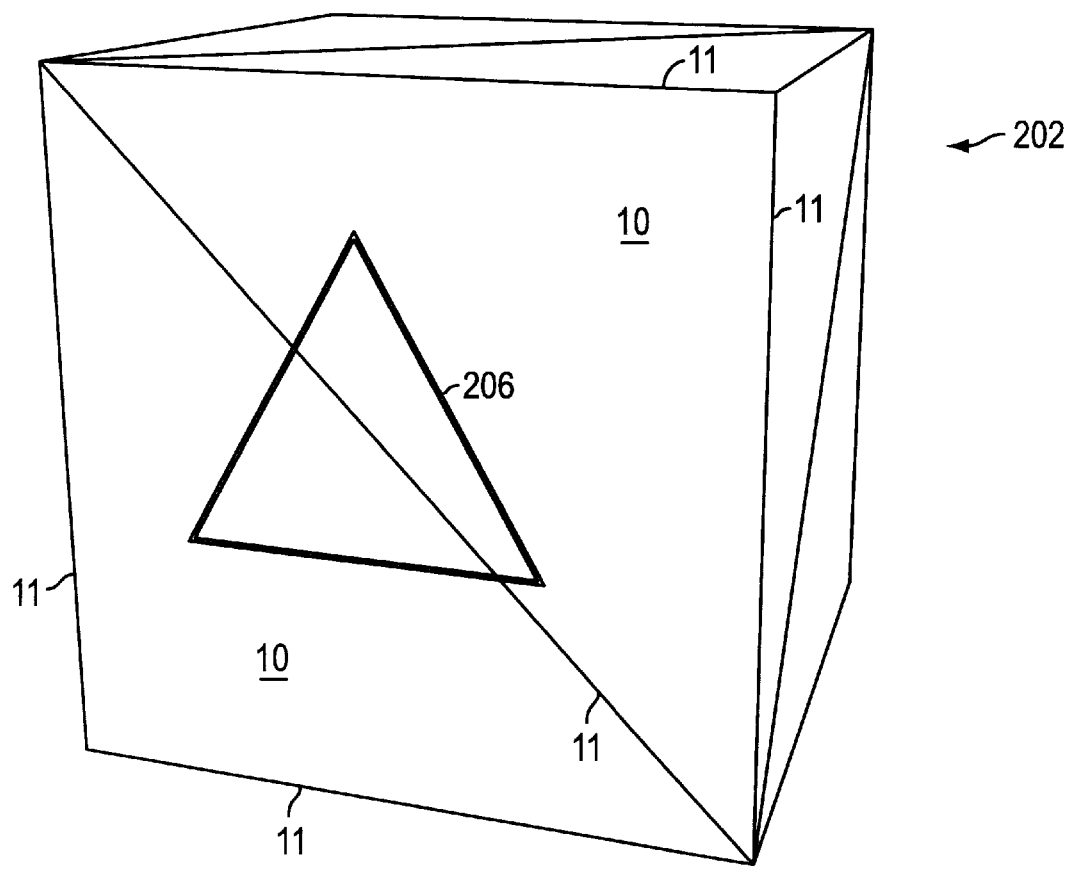
FIGS. 5A and 5B are relief representations of the base meshes of FIGS. 4A and 4B displaying an intersection curve.
Figure 5B:
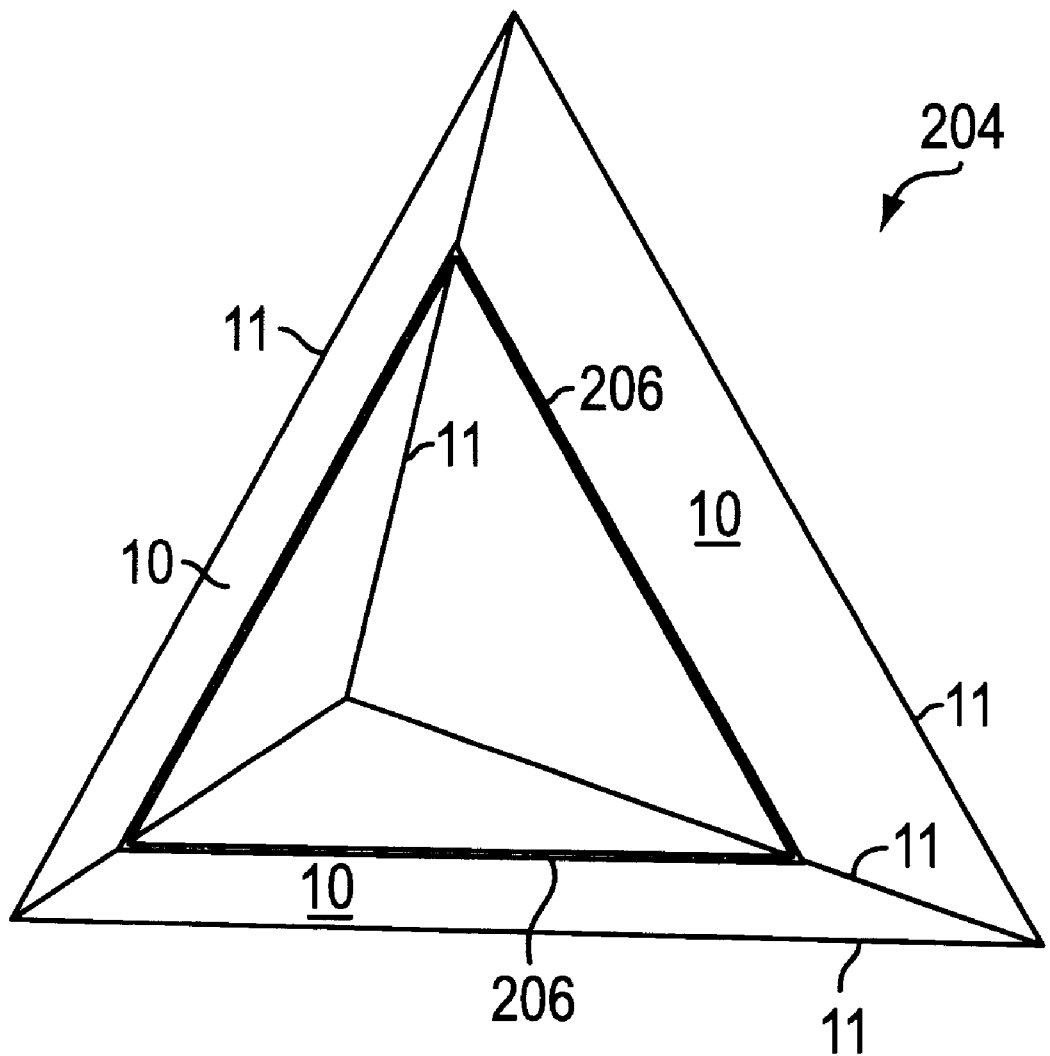

As a next step, referring to FIGS. 4A and 4B, the meshes representing the respective surfaces (e.g., 202 and 204) are intersected, forming in general an intersection curve 206 (shown as a thicker line) (step 104). For clarity, FIGS. 5A and 5B shows intersection curve 206 on meshes 204 and 206 separately.

Figure 6A:
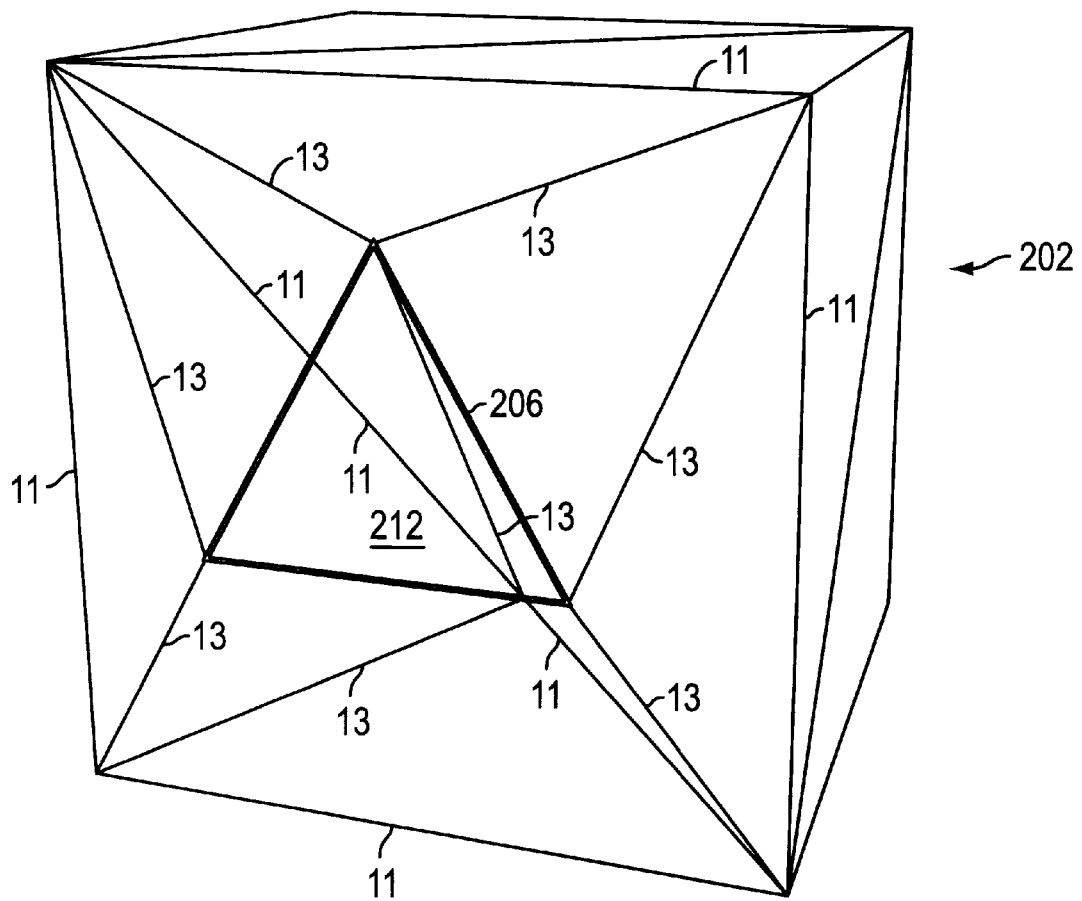
FIGS. 6A and 6B are relief representations of the two base meshes of FIGS. 4A and 4B showing tessellations of intersecting faces.
Figure 6B:
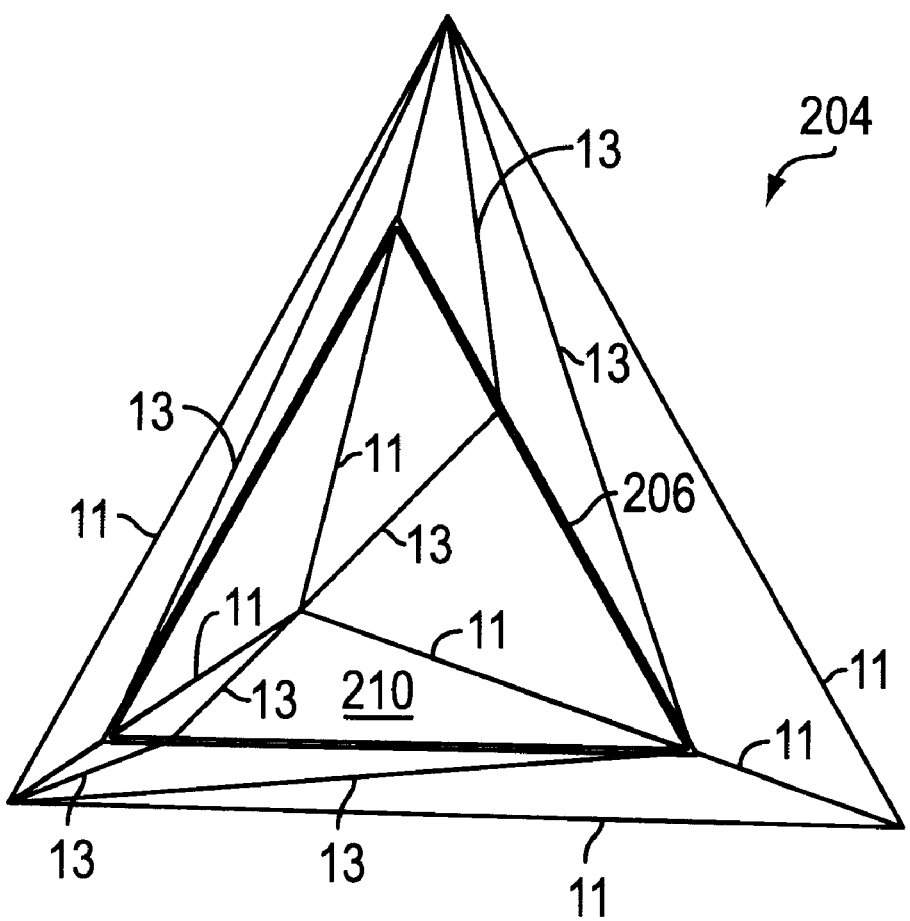

Referring to FIGS. 6A and 6B, each mesh 202 and 204 is tesselated (step 106) (i.e., here triangulated) around intersection curve 206, so that each mesh has further triangular faces formed by prior edges 11, intersection curve 206, and new edges 13. The individual triangles of the base meshes that directly connect to the intersection curve 206 are determined. A face of one mesh will typically intersect more than one face of the other mesh. The details of handling various types of mid-face intersections are described below.

Since the base meshes are generally rough approximations of their limiting surfaces, it may happen that two subdivision meshes may intersect at their current level of refinement (i.e., with respect to the typical sizes of their constituent faces), even though the final limiting surfaces to be constructed from the meshes will not intersect (or the two meshes may not intersect, when intersection is desired). In such instances, one or more of the base meshes can be further refined, adding more (and smaller) faces, or the base meshes can be repositioned with respect to one another, until the desired level of intersection occurs.

Figure 7A:
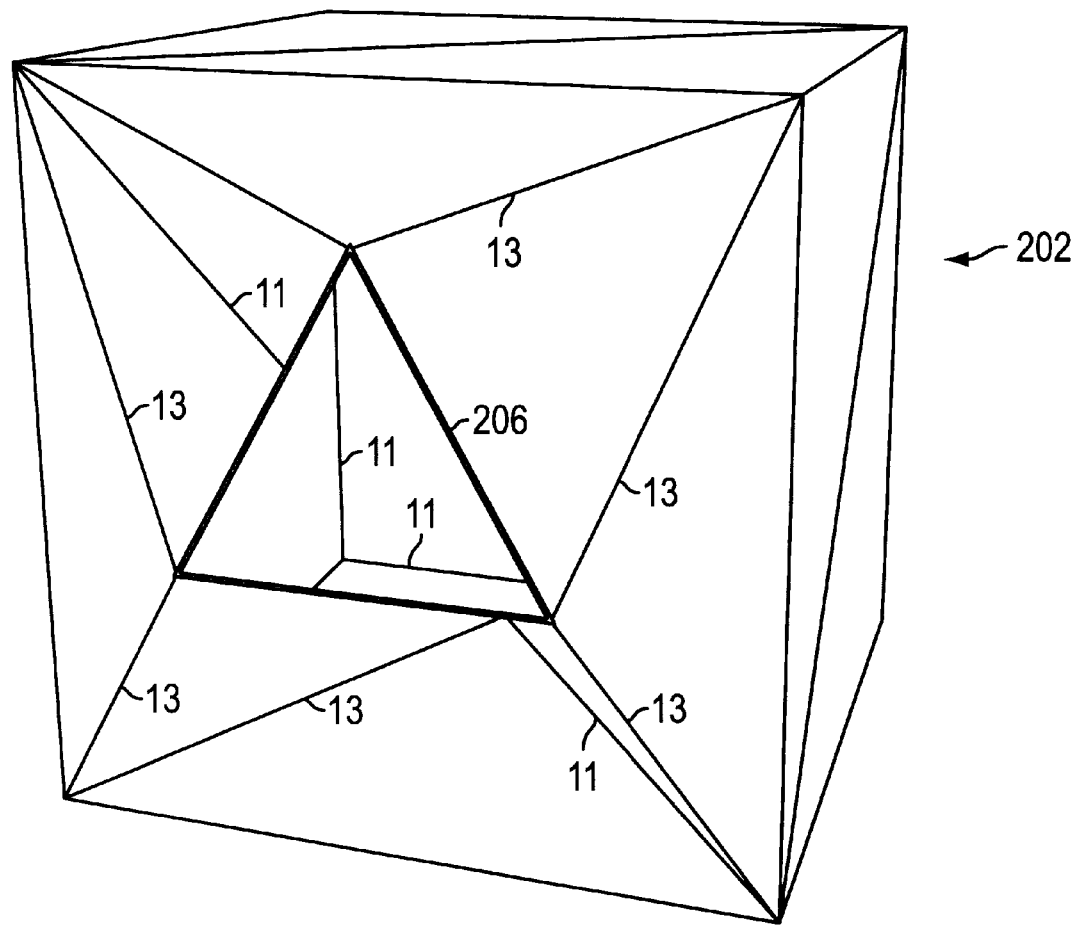
FIGS. 7A and 7B are relief representations of the two base meshes, with removed faces for Boolean subtraction.
Figure 7B:
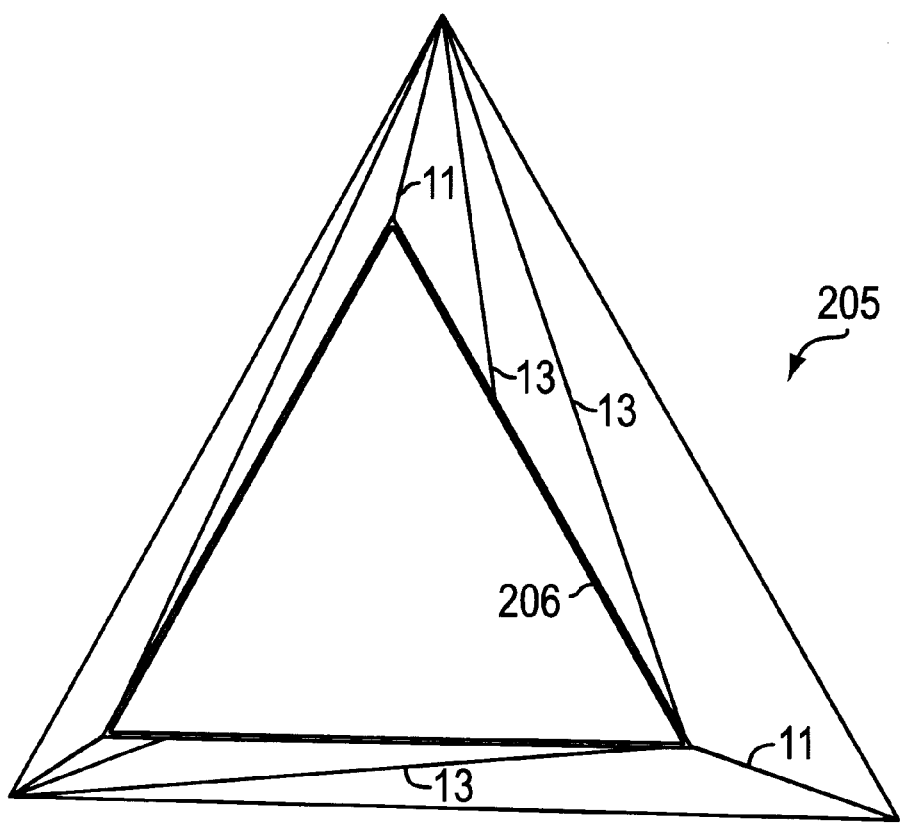

Referring to FIGS. 7A and 7B, those portions of the base meshes that will be retained and combined together are selected (step 108). The selection of the surviving surfaces can be done by having the modeler/user manually select particular regions to retain, or by having a computer automatically select surviving surfaces, based upon a particular join type for the base meshes, for example, in a program that emulates CSG-like operations upon bounded volumes modeled with subdivision surfaces. After the portions to be retained are selected, the unwanted faces (those faces belonging to the unwanted portions of each respective base mesh after intersection) are removed (step 110).

Figure 8A:
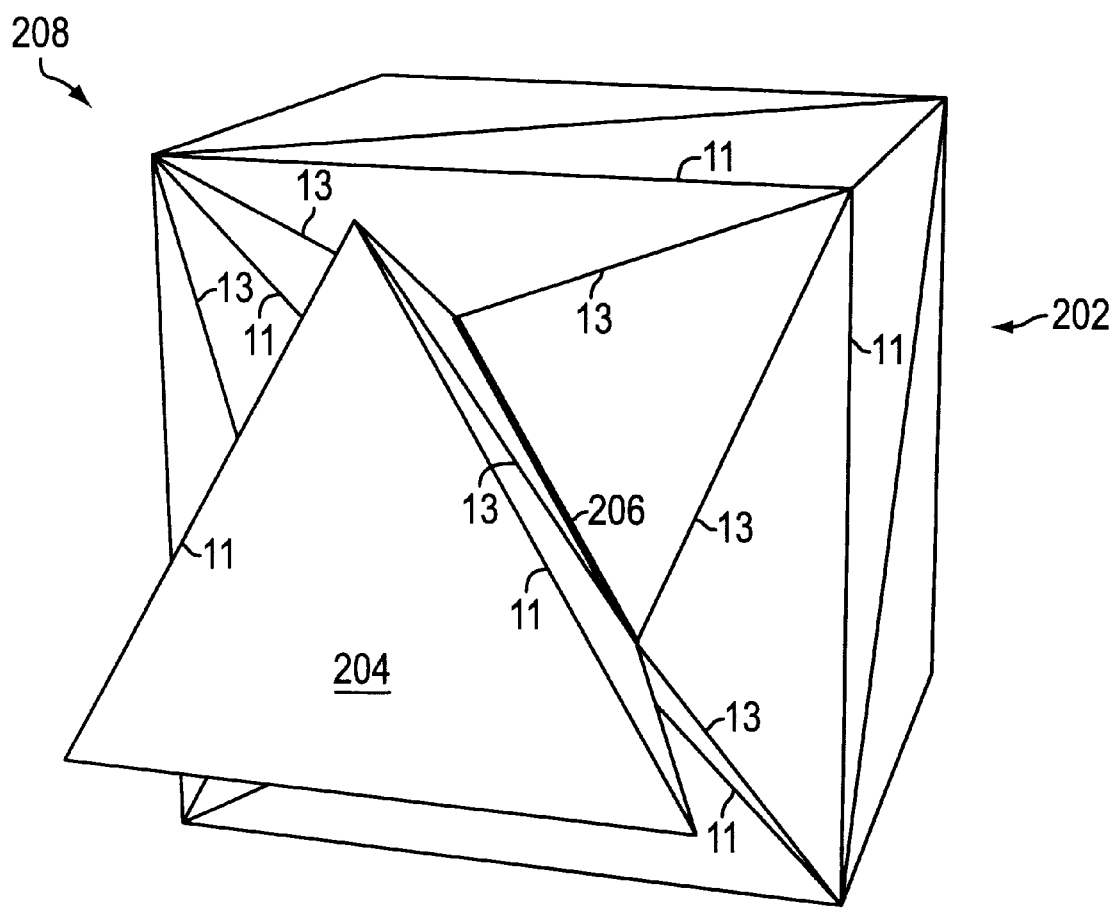
FIGS. 8A and 8B are relief representations of a Boolean join of the two meshes of FIGS. 7A and 7B.
Figure 8B:
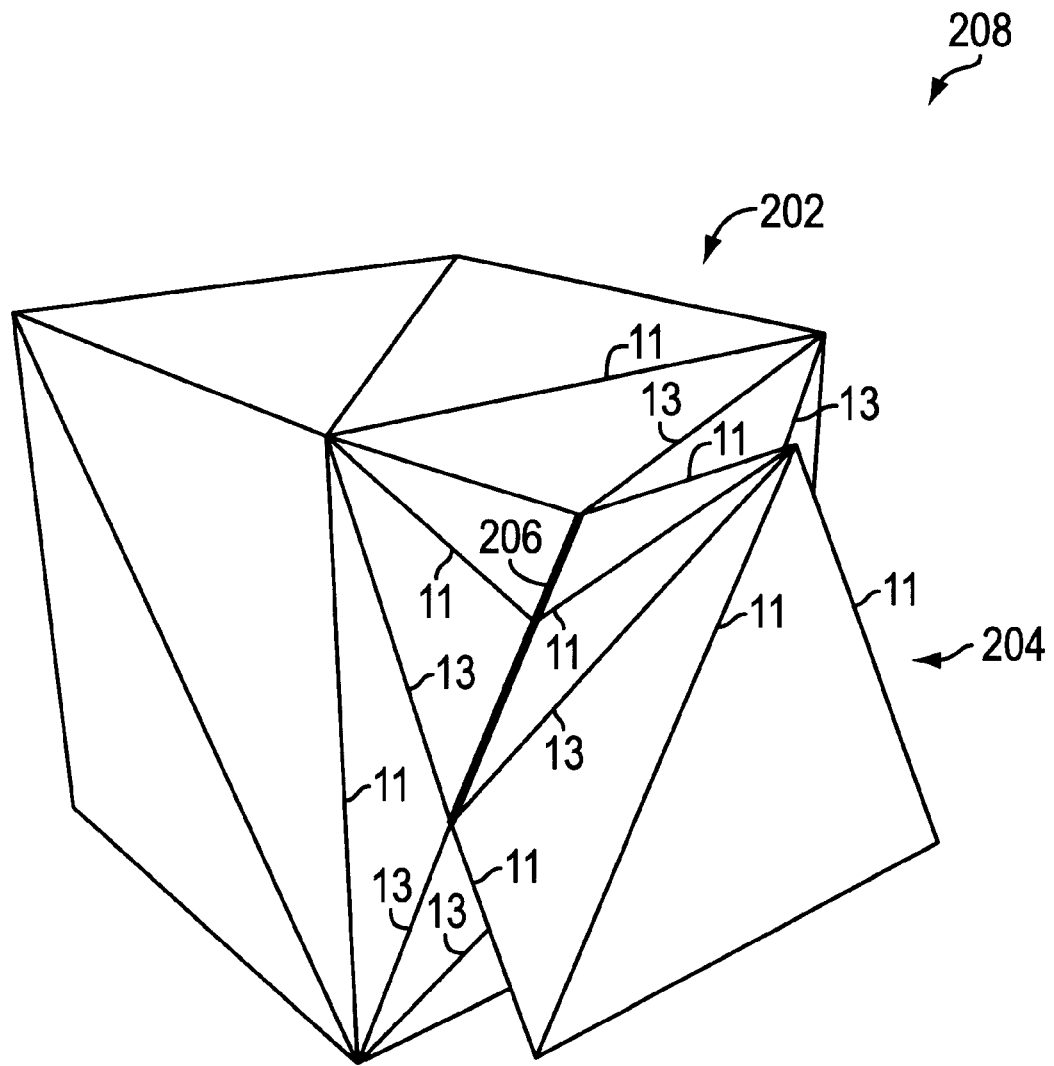

Referring to FIG. 8, after removal of unwanted faces, the collection of remaining faces is combined together into a new single mesh 208 (step 112). At that point, a final limiting surface can be constructed from the resulting mesh, using appropriate subdivision rules (step 114). This final step, however, is not required for the present invention.

Figure 9:
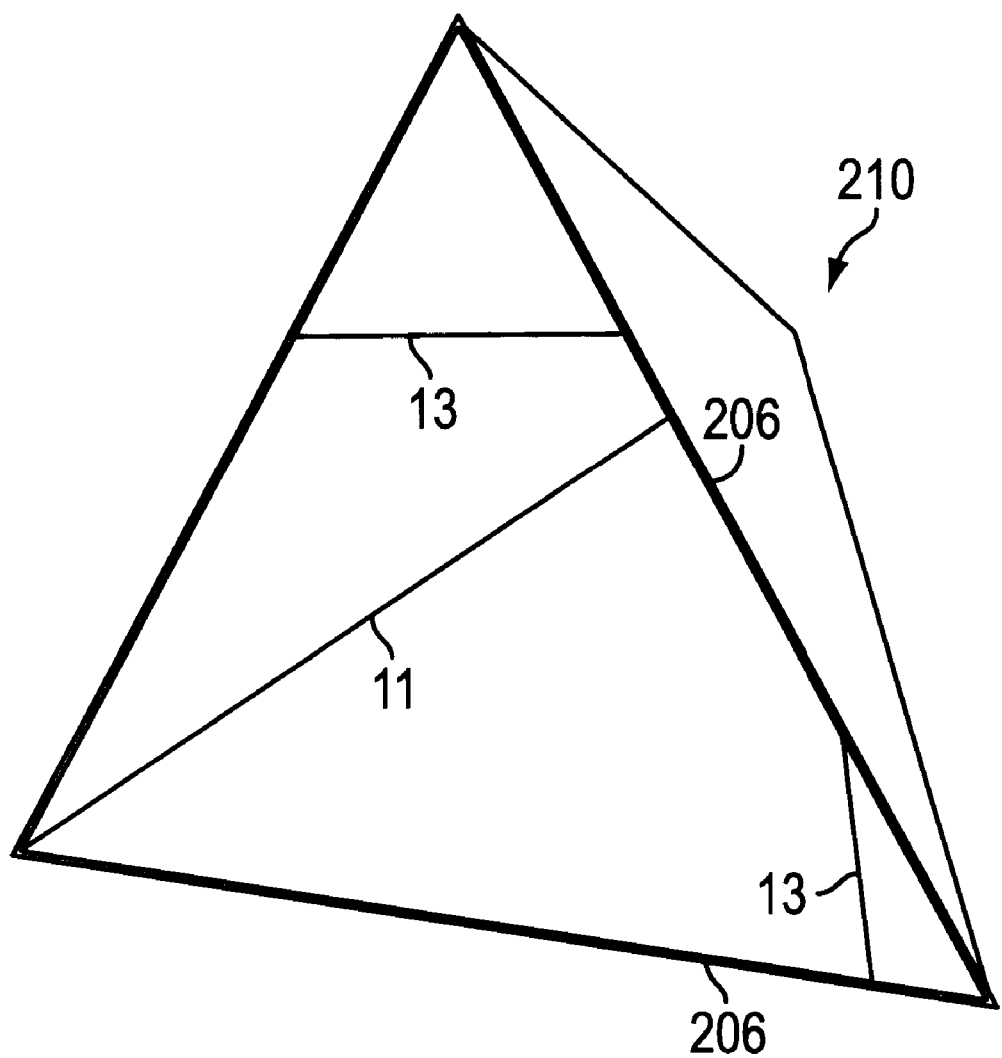
FIG. 9 is a relief representation of the base mesh of FIG. 6B with other faces removed for Boolean subtraction.
Figure 10:
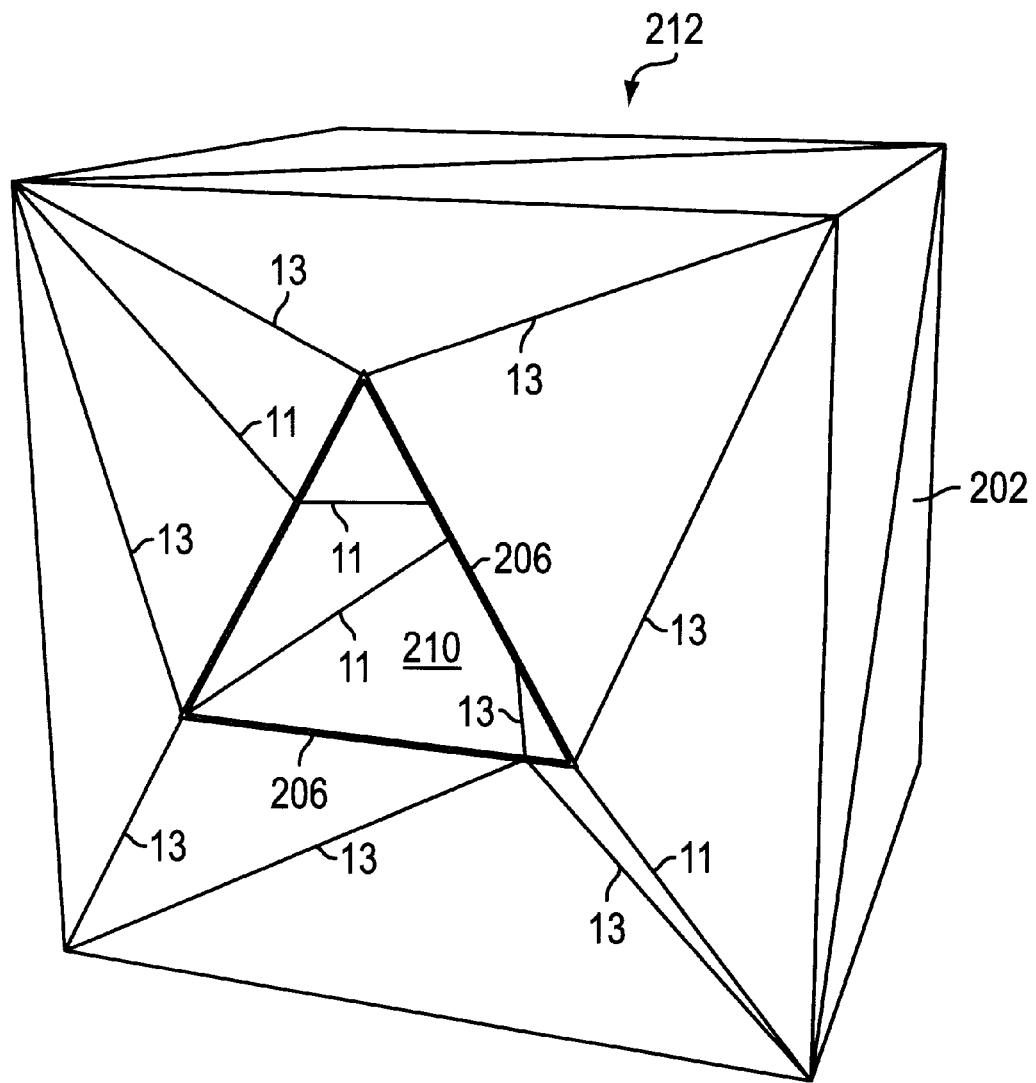
FIG. 10 is a relief representation of another Boolean join of the meshes of FIGS. 9 and 7A.
Figure 11A:
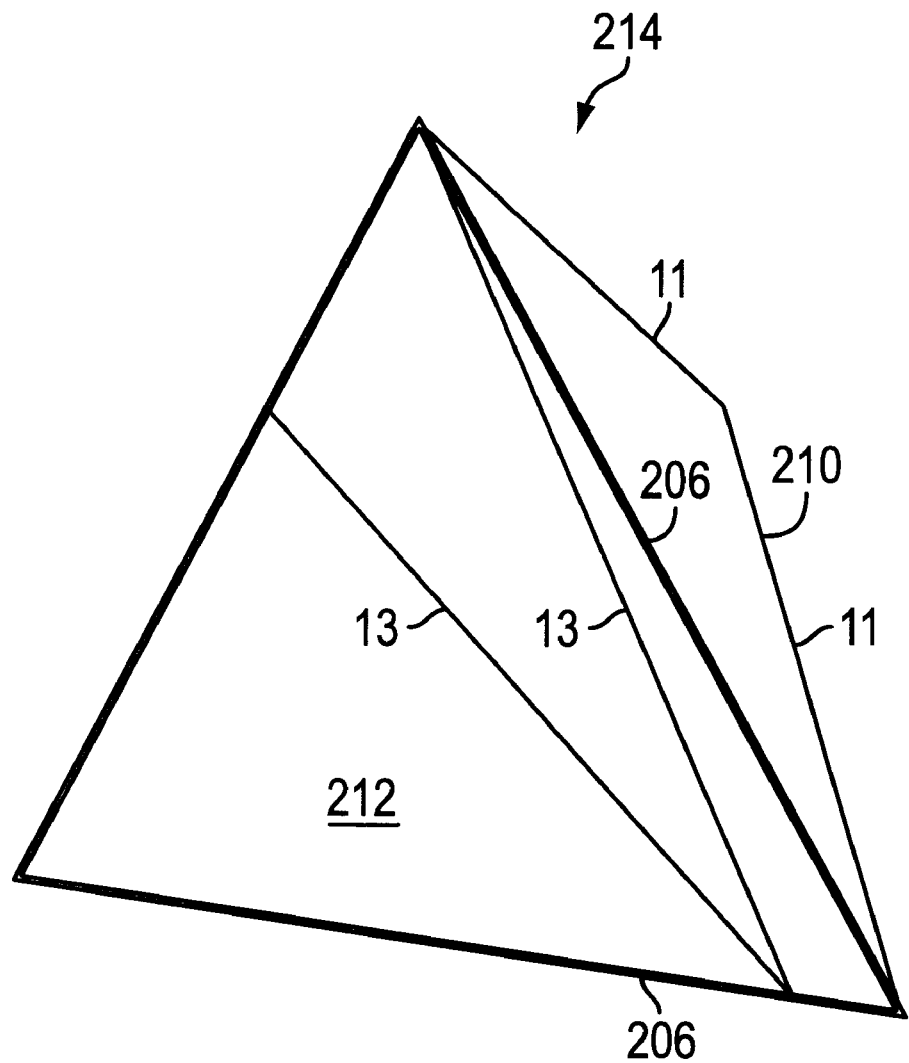
FIGS. 11A and 11B are relief representation of other Boolean joins of the removed triangular portion of the mesh of FIG. 6A with, respectively, the mesh of FIG. 9 (FIG. 11A) and the mesh of FIG. 7B (FIG. 11B).
Figure 11B:
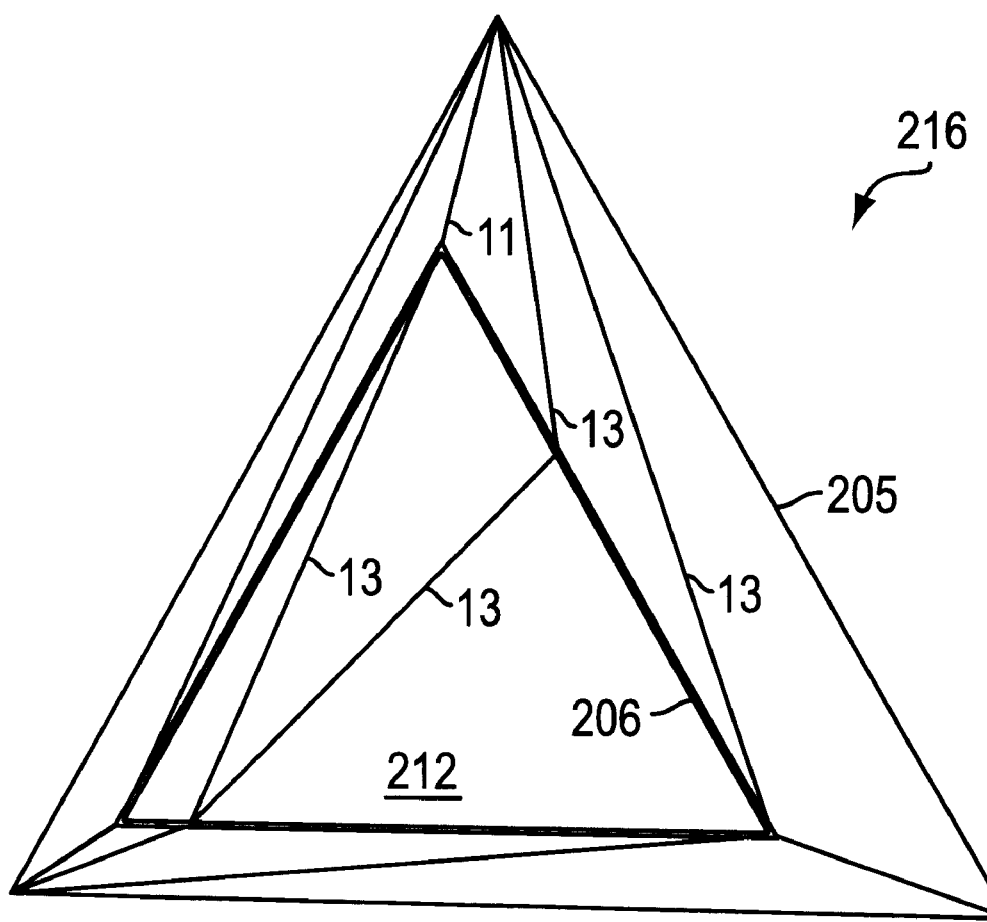

Referring to FIGS. 9 through 11, a number of other surfaces can be created out of different combinations of the two base meshes of FIGS. 6A and 6B. For example, taking the top portion 210 of mesh 204 (FIG. 9) and combining it with the remaining portion of mesh 202 in FIG. 7A yields the final mesh 212 shown in FIG. 10. Final mesh 212 has a triangular hole formed by intersection curve 206, lined by the top portion 210 of the original pyramid of base mesh 204. Similarly, taking the top portion 210 of mesh 204 (in FIG. 9), and combining it with the triangular inner portion 212 of intersection curve 206 in mesh 202 (FIG. 6A) yields a final mesh 214 for a smaller triangular pyramid, as shown in FIG. 11A. And taking the triangular inner portion 212 of intersection curve 206 in mesh 202 (FIG. 6A) and combining it with the bottom portion 205 of mesh 204 (in FIG. 7b) yields a final mesh 216 for a truncated triangular pyramid, as shown in FIG. 11B.

Once the intersection curve has been determined step 104), the intersecting faces have been tesselated (e.g., triangulated) (step 106), and the surviving portions of each mesh have been selected (step 108), the non-surviving portions of each mesh are removed (step 110) and the remainder are combined into the final mesh (step 112), from which a surface can be constructed by further subdivision (step 114).

Computer-Implemented Procedures

The following discussion describes a data structure and computer-implemented procedures for performing Boolean operations method 100.

Data Structures

A convenient data structure can significantly simplify and speed performing Boolean operations on base meshes. Use of the data structure helps to avoid searches through the entire mesh, keeping computational costs of queries relatively constant. Further, by using triangular meshes, a simple data structure can be used.

Figure 12:
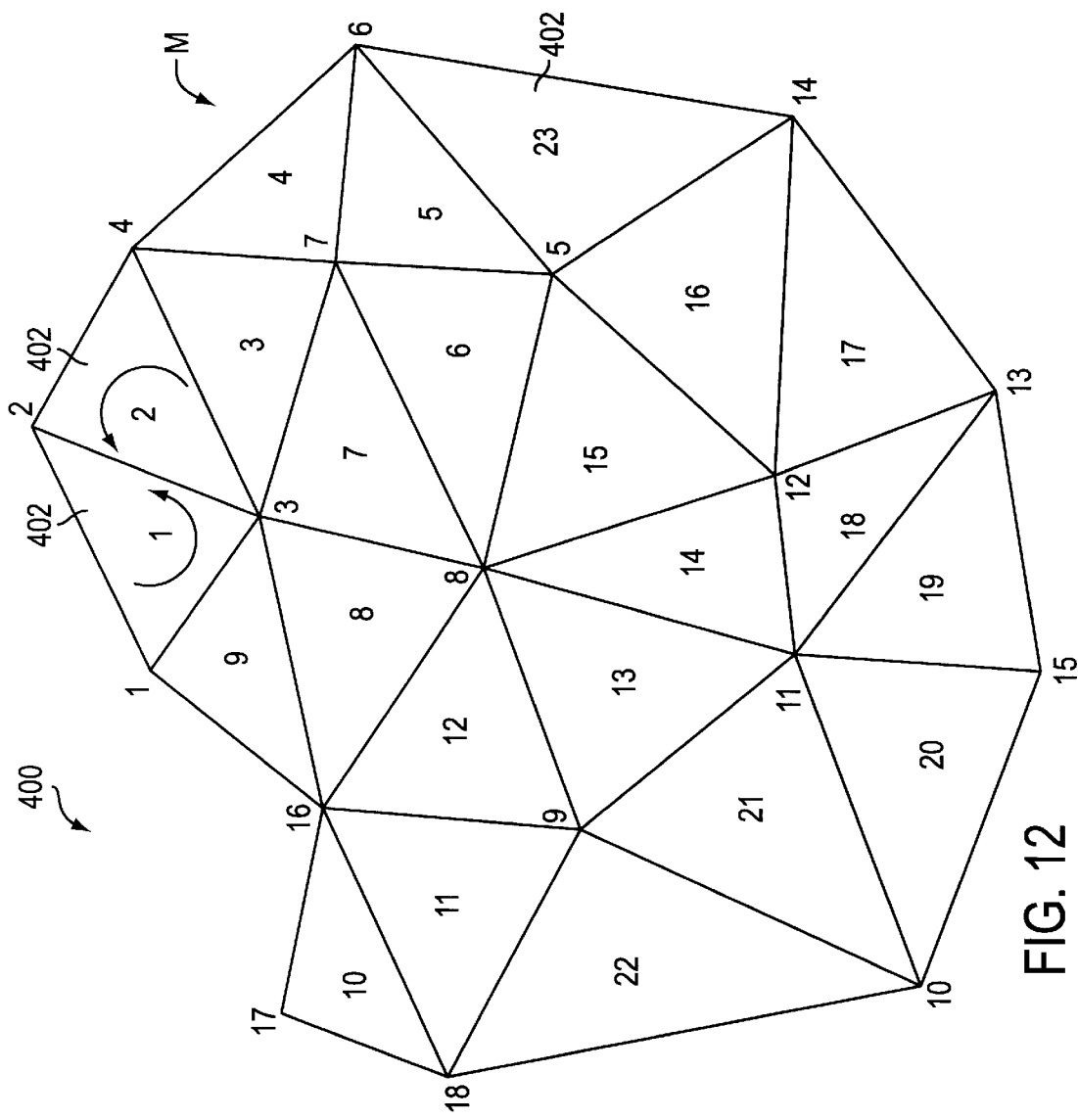
FIG. 12 is a schematic diagram of a subdivision mesh.

The raw data for a mesh M can be given by two lists, a point list p[M] and a face list f[M]. This can be provided in a number of ways, including computer generation, object scanning, or designer input. Given a mesh M as shown in FIG. 12, a point list for mesh M (p[M]) is given by a list of the Cartesian coordinates of each vertex:

p[M]={{$x_1, y_1, z_1$}, {$x_2, y_2, z_2$}, . . . {$x_m, y_m, z_m$}} where each vertex is given an ordinal number I determined by its place within the point list. A face list f[M] is also given, e.g.:

f[M]={{1,3,2}, {2,3,4}, {4,3,7}, {4,7,6}, {6,7,5}, {5,7,8}, {7,3,8}, {8,3,6},

{3,1,16}, {16,17,18}, {16,18,9}, {16,9,8}, {8,9,11}, {8,11,12}, {8,12,5}, {12,14,5},

{12,13,14}, {12,11,13}, {11,15,13},

{11,10,15}, {11,9,10}, {9,18,10}, {6,5,14}} in which each face is represented by a "face triple" of three vertex numbers in a particular ordering, representing the order in which vertices of a face are traversed. Each face is given an ordinal number determined by its position in the list. That is, face 1 is formed by vertex points 1, 3, and 2. In FIG. 12, each face is represented by a face number shown in the middle of each face, e.g., face 8 is in the triangle formed by vertex points 3, 8, and 16. In the example, the mesh is "consistently oriented". This means that whenever two faces share an edge, that edge is traversed in opposite directions in the two faces. If the faces listed in f[M] are not consistently oriented, a MakeConsistent() algorithm (discussed below) can be applied to reorder the vertices in one or more faces to make the resulting mesh M consistent.

Two useful data structure lists that can be constructed from the basic point and face lists are a vertex connectivity list V[M] and a triangle (or, general, face) connectivity list T[M]. The ith element of V[M], {I, {$f_1, \ldots, f_j$}, {$p_1, \ldots, p_k$}}, indicates that the ith point is contained in faces numbered $f_1$ through $f_j$ in f[M] and is connected to points numbered $p_1$ through $p_k$ in p[M]. For the same example of FIG. 12, a vertex list could be expressed as:

V[M]={{1,{1,9},{2,3,16}}, {2,{1,2},{1,3,4}}, {3,{1,2,3,7,8,9},{1,2,4,7,8,16}}

{4,{2,3,4},{2,3,6,7}}{5,{5,6,15,16,23},{6,7,8,12,14}}{6,{4,5,23}, {4,5,7,14}}

{7,{3,4,5,6,7},{3,4,5,6,8}}{8,{6,7,8,12,13,14,15},{3,5,7,9,11,12,16}}{9,{11,12,13,21,22},{8,10,11,16,18}}

{10,{20,21,22},{9,11,15,18}}{11,{13,14,18,19,20,21},{8,9,10,12,13,15}}{12,{14,15,16,17,18},{5,8,11,13,14}}

{13,{17,18,19},{11,12,14,15}}{14,{16,17,23},{5,6,12,13}}{15,{19,20},{10,11,13}}

{16,{8,9,10,11,12},{1,3,8,9,17,18}}{17,{10},{16,18}}{18,{10,11,22},{9,10,16,17}}};

where, for example, the first vertex 1 belongs to both faces 1 and 9, and is connected to neighboring vertices 2, 3, and 16.

The ith element of T[M], for each face of the mesh, is of the form {I, {$f_1, f_2, f_3$}}, where $f_1, f_2$, and $f_3$ are neighbors of face I, with face $f_1$ opposite the first vertex of the ith face (as listed in the face list f[M]), $f_2$ opposite the second vertex face, and face $f_3$ opposite the third vertex. If, for example, one vertex of face I is not opposite any face, then the appropriate $f_1, f_2$, or $f_3$ is set to −1, indicating that the edge opposite to that vertex is a boundary edge. For the example of FIG. 12, the triangle connectivity list T[M] can be represented by:

T[M]={{1, {2,-1,9}}, {2, {3,-1,1}}, {3, {7,4,2}}, {4, {5,-1,3}}, {5, {6,23,4}}, {6, {7,15,5}},

{7, {8,6,3}}, {8, {9,12,7}}, {9, {-1,8,1}}, {10, {-1,11,-1}}, {11, {22,12,10}}, {12, {13,8,11}},

{13, {21,14,12}}, {14, (18,15,13)}, {15, {16,6,14}}, {16, {23,15,17}}, {17, {-1,16,18}}, {18, {19,17,14}},

{19, {-1,18,20}}, {20, {-1,19,21}}, {21, {22,20,13}}, {22, {-1,21,11}}{23, {16,-1,5}}};

where, for example, face 4 in the face list f[M] is {4, 7, 6}, and its entry in the triangle connectivity list t[M] is {4, {5, -1, 3}}, since face 5 is opposite the first vertex, (point 4), no face is opposite the second vertex (point 7), and face 3 is opposite to the third vertex (point 6).

The data structure lists can be employed to quickly answer questions during the tracing of the intersection curve. For example, given the mesh of FIG. 12, if one has a proper edge formed by two vertices (e.g., {3,8}), one can quickly determine the two faces sharing that edge. From the V[M], vertex 3 is shared by faces 1, 2, 3, 7, 8, and 9, while vertex 8 is shared by faces 6, 7, 8, 12, 13, 14, and 15. The common faces of these lists are faces 7 and 8, the faces shares by edge {3,8}. Using similar techniques, one can determine that an alleged edge {3,5} is not a legal edge. As another example, suppose the intersection curve is traced from face 13 ({8,9,11}); when reaching edge {8,11}, it is necessary to know the next face on which to continue the trace. Since edge {8,1} is opposite to the second vertex of face 13 (one can say that "the index of the edge {8,11} with respect to face 13 is 2"), and since the 13th element of T[M] is {13,{21,14,12}}, the next face must be face 14, being directly opposite the second vertex of face 13, and therefore coupled to edge {8,11}.

Orientation

Two neighboring triangles are said to be "compatible", if in the face triples, a common edge is traversed in opposite senses. A mesh is said to be consistently oriented if all neighboring faces are compatible. If, as in FIG. 12, face 2 were listed as {3,2,4}, then face 1 and face 2 would not be compatible. To make them compatible, one need only reverse the vertex listing of one face, for example changing face 2 to {4,2,3} (which is equivalent to {2,3,4} given in f[M] above).

For the intersection computations below, the two meshes need not each be consistently oriented. However, later processing steps generally depend on each mesh having a consistent orientation. In practice, the face lists f[M] should be already consistently oriented. But if the orientation is not known, or the mesh is not consistently oriented, one can invoke an algorithm MakeConsistent(M) which simply re-orders the relevant faces, by reversing the vertex listings of certain faces in f[M], with a corresponding reversal in the adjacent face listing in T[M].

MakeConsistent(M) divides the list of faces into two lists: a test list (initially containing just the face 1), and a rest list containing the rest. The first element f of test is tested against its neighbors (at most three, found immediately from T[M]) in rest for compatibility. If a neighbor face is not compatible, its vertex ordering is reversed. These faces are then appended to test and deleted from rest, while f is removed from test. This continues until rest is empty. This routine and the construction of the data structure can be somewhat time-consuming, but need only be done once. Furthermore, the Boolean result from two consistent meshes is guaranteed (by the algorithms to follow) to be consistent, so that no future application of MakeConsistent() will be necessary when this mesh is later used to combine with another.

Intersection

As a point of notation, vertices and faces can be referred to in several ways, which will be clear from the context. For example, a vertex may be referred to by its vertex number, or by its Cartesian coordinates. A face can be referred to by its face number (e.g., face 17), or by its face triple (i.e., its ordered list of three vertex number (e.g., face {3,18,21})). The index of a vertex with respect to a face is the position of the vertex in the face triple. For example, vertex 18 in {3,18,21} is the vertex with index 2. The index of an edge with respect to a face is the index of the vertex opposite that edge; thus, the edge {3,21} of face {3,18,21} has index 2, being opposite vertex 18.

To help in calculating the intersection curve of each mesh, two queries can be used:

NextFace(m, face, edge) finds the face in mesh m (e.g., m=1,2, etc.) adjacent to face sharing the same edge; and BoundaryEdgeQ(m, edge) returns True if edge is a boundary edge of mesh m.

The basic routines for performing the intersection of one mesh with another include procedures for determining segment/segment, ray/segment, segment/face, and face/face intersections. The first three intersection routines are straightforward, and are not described in detail. The face/face intersection routine FaceXFace() is described below. The primary main mesh/mesh intersection algorithm March() uses FaceXFace() repeatedly.

FaceXFace(V, x, ind, W) finds the segment of intersection {x,y} of two triangular faces $V=\{v_1,v_2,v_3\}$ and $W=\{w_1,w_2,w_3\}$, given a starting point x on an edge of V. The index ind indicates on which edge of V is the point x. The result int of FaceXFace() contains several fields:

int[1]=y, the terminal point of the intersection segment, in three dimensional coordinates;

int[2]={i,j} if y ∈ Interior($v_i,v_j$) of face V, Null otherwise;

int[3]=k if y=$V_k$, the kth vertex of V, Null otherwise;

int[4]={i,j} if y ∈ Interior($w_i,w_j$) of face W, Null otherwise; and int[5]=k if y=$W_k$, the kth vertex of W, Null otherwise.

Here, Interior($v_i,v_j$) means the line segment ($v_i,v_j$) excluding the end points. The output int describes exactly how face V intersects face W, (int[2], . . . , int[5]) being a precise record of the relative position of the terminal point y. This information will be used in the tracing algorithm March().

Figure 13A:
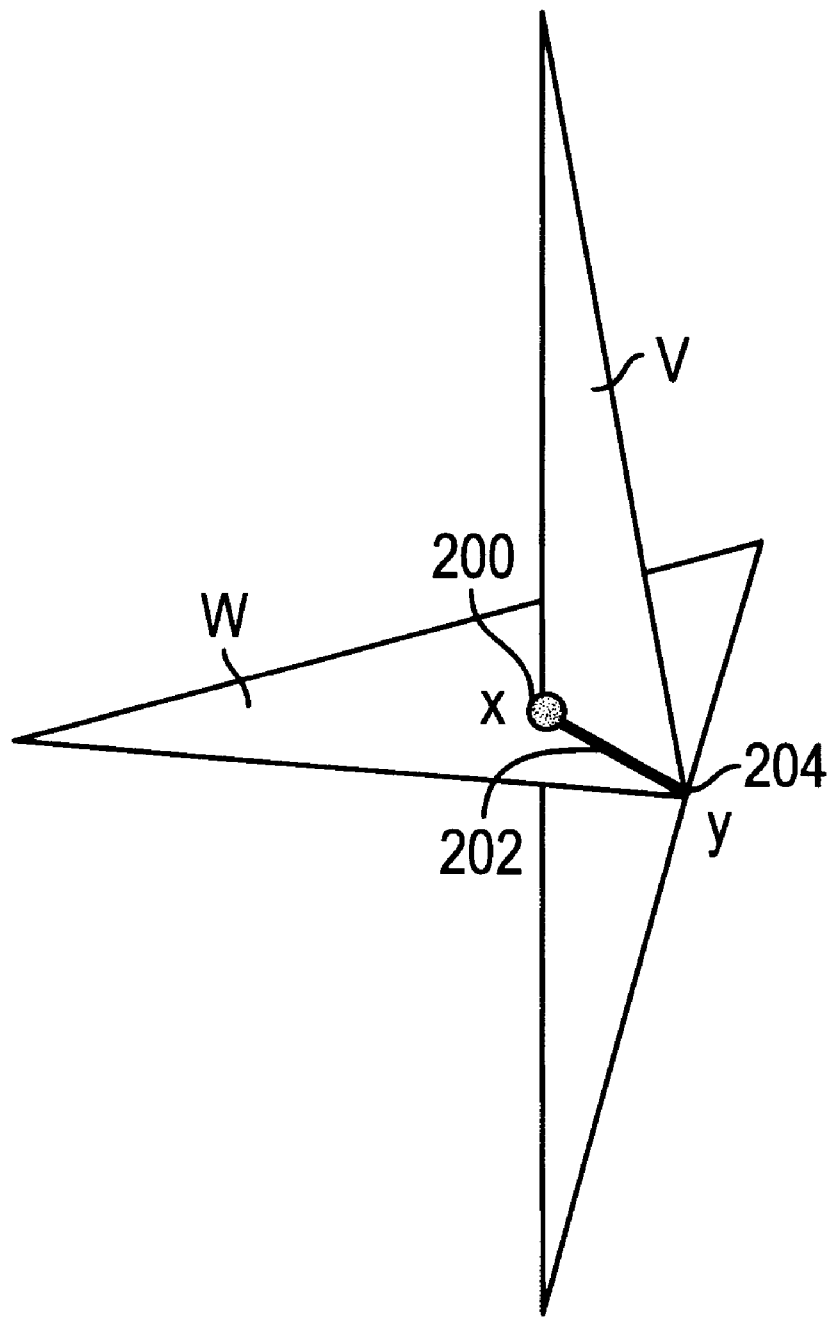
FIGS. 13A through 13N are representations of various cases of intersecting subdivision faces.
Figure 13B:
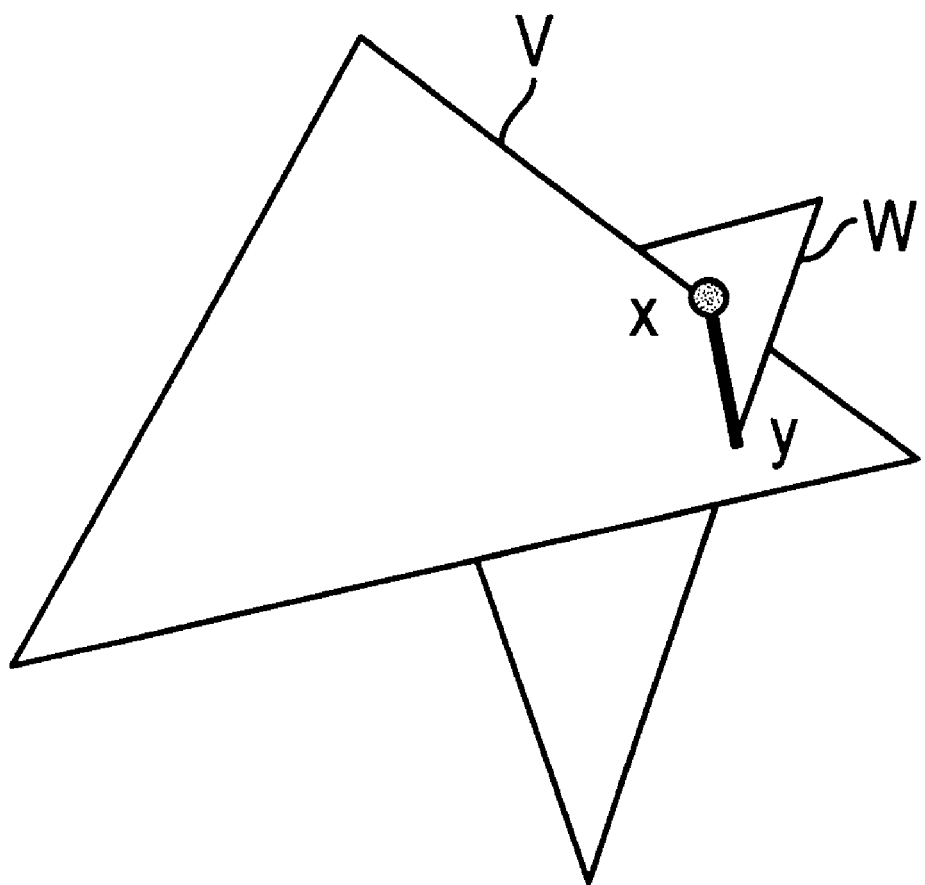
Figure 13C:
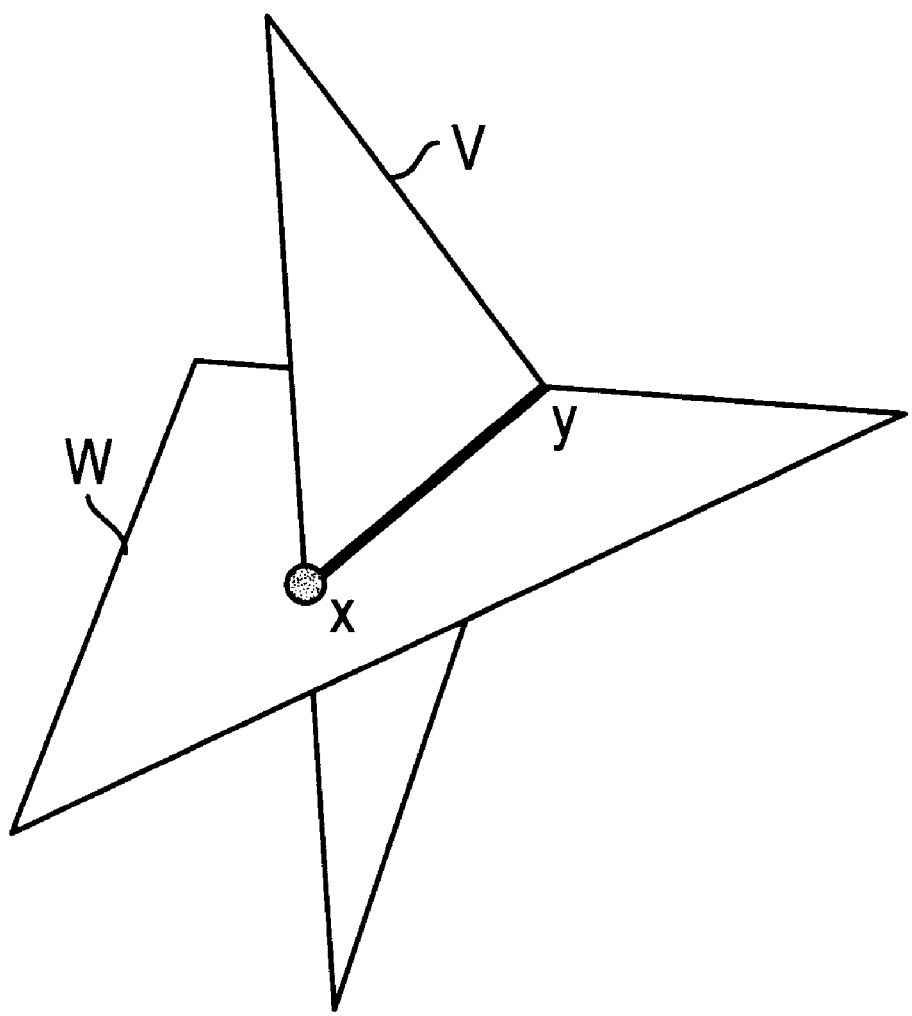
Figure 13D:
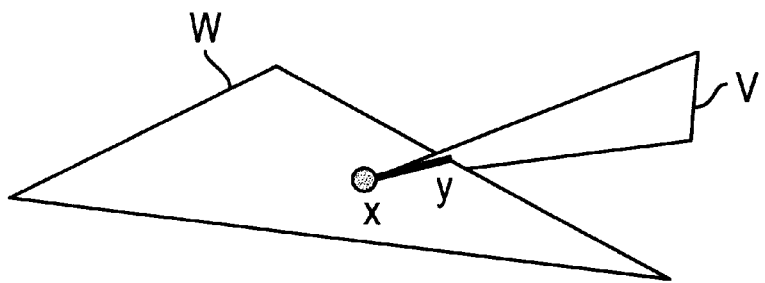
Figure 13E:
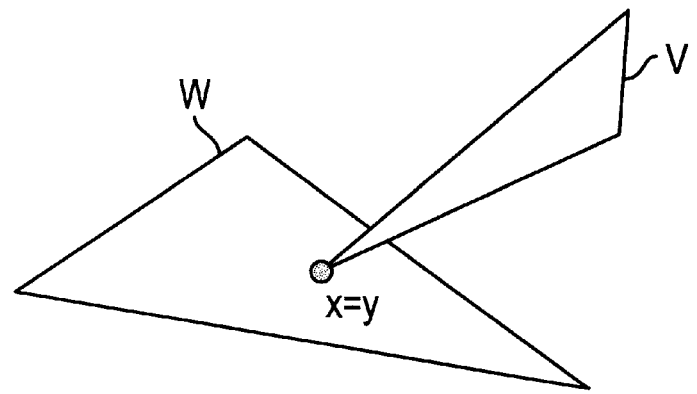
Figure 13F:
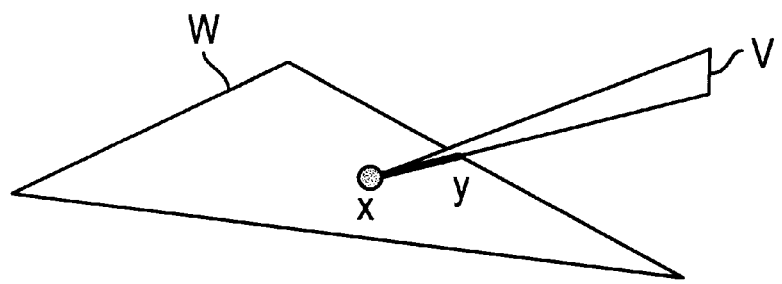
Figure 13G:
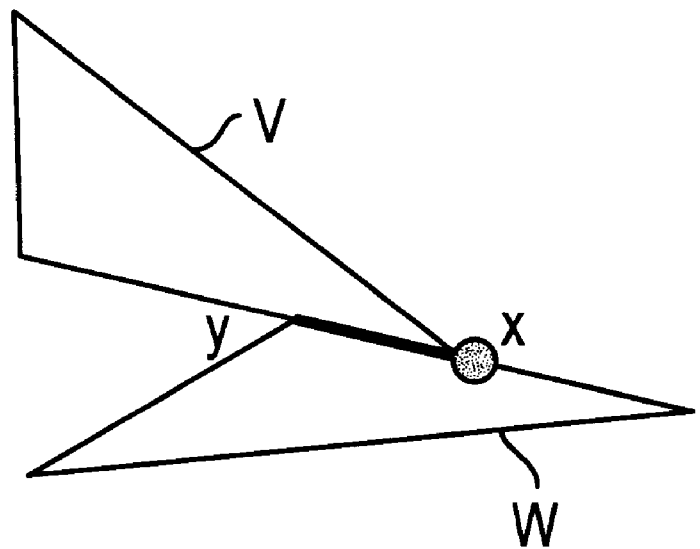
Figure 13H:
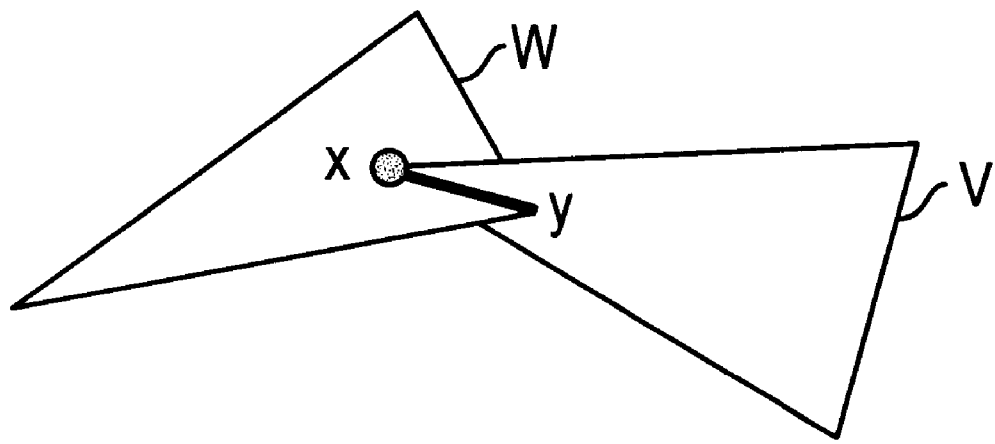
Figure 13I:
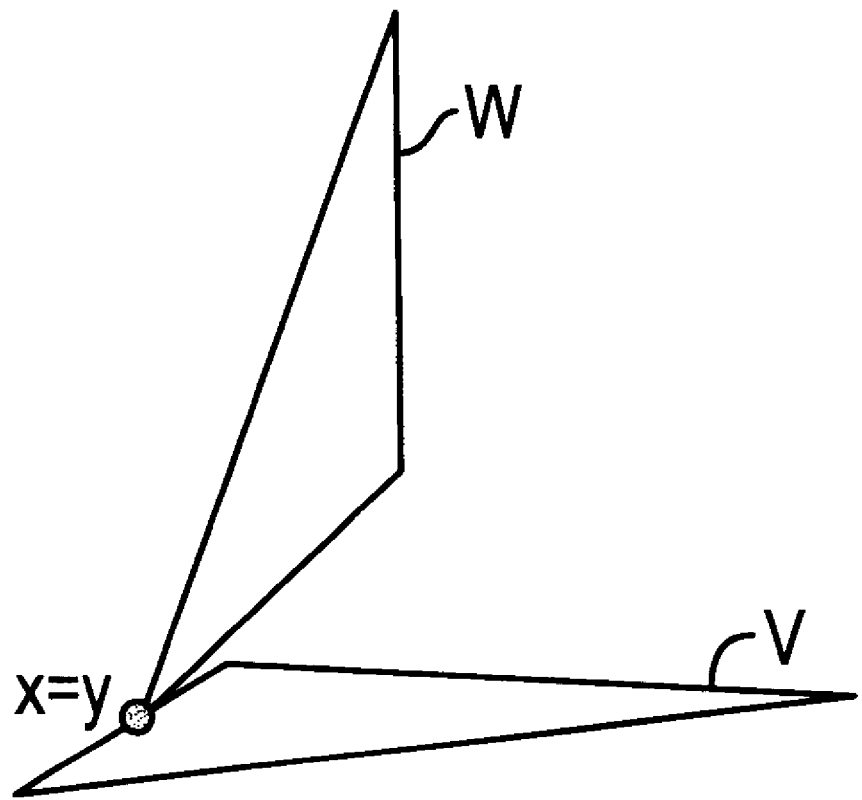
Figure 13J:
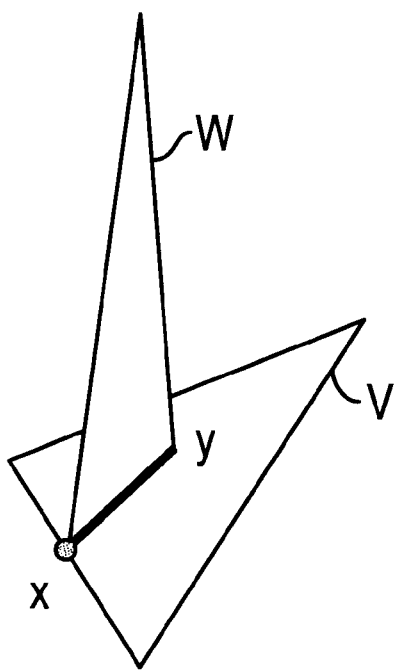
Figure 13K:
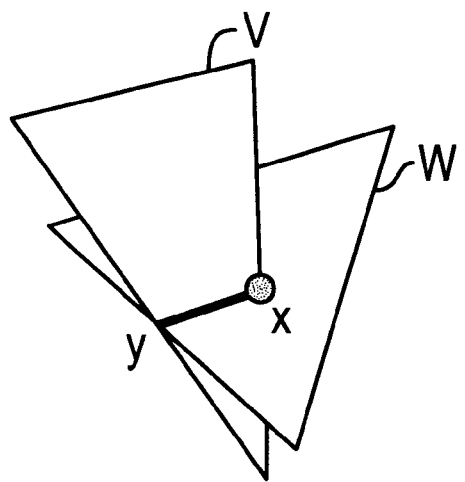
Figure 13L:
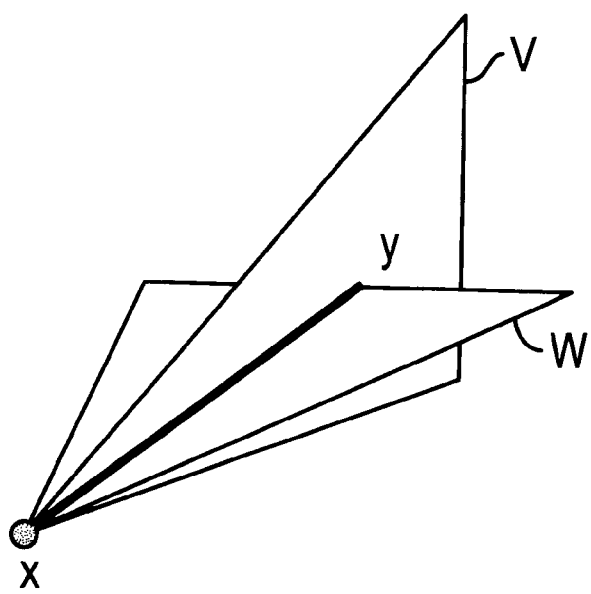
Figure 13M:
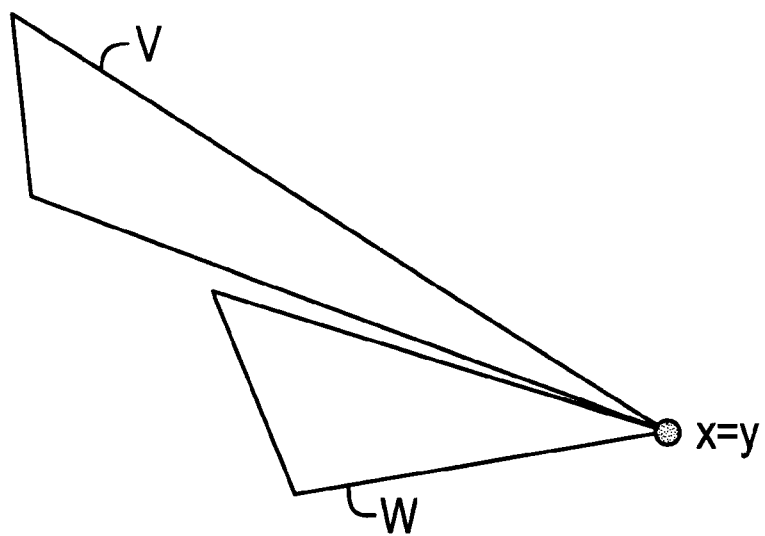
Figure 13N:
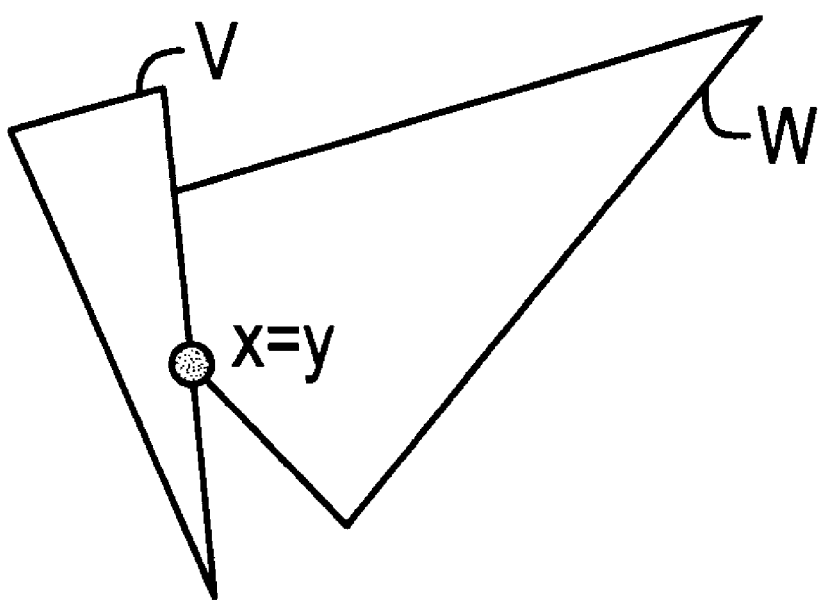

A number of examples of such intersections, shown in FIGS. 13A through 13N, along with the respective output int of FaceXFace(). The heavy dot in each figure represents the starting point x (found by segment/face intersection), whose coordinates int[1] are immaterial here.

In FIG. 13A, for example, the starting point x (point 300) on face V begins the intersection line 302, which ends at point y (point 304). In FIG. 13A, $y=v_3=w_3$, and the output of FaceXFace() for this intersection is given (as shown) by int={{1,0,0}, null, 3, null, 3}, where {1,0,0} is the coordinate of endpoint 304 (point y)(the coordinate system is not shown), point y is not interior to any edge of V (Null), point y is the third vertex point of face V (3), point y is not interior to any edge of W (Null), and point y is also the third vertex point of face W (3). In FIG. 13B, y is in the interior of V (it is not on the boundary, so int[2]=int[3]=Null), and y lies in the interior of edge {2,3} of W since int[4]={2,3}.

The FaceXFace() procedure handles all the examples shown in FIGS. 13A through 13N. For sake of clarity, the description of FaceXFace() below describes how to determine y in a regular case, where an edge of V pierces through W at an interior point x of W. This is the case in examples shown in FIGS. 13A, 13B, 13C, and 13K. The code for FaceXFace() should be constructed to handle all special cases, such as those shown in FIGS. 13D through 13J, and 13M, in a straightforward manner, as one of skill in the art can apprehend.

Assume, with no loss in generality, that $x \in \{v_1,v_2\}$. Let $n_v=(v_2-v_1)\times(v_3-v_1)$ be chosen as the normal of V, and similarly $n_w$ be chosen as any normal of W. The intersection of the two planes defined by V and W is directed along a vector $d:=\pm(n_v \times n_w)$. To find that part of the intersection which lies inside V, d must be chosen so that x+d and $v_3$ lie on the same side of $\{v_1,v_2\}$. It can be shown that this amounts to choosing the + sign if $(v_2-v_1) \; n_w > 0$, and choosing the − sign otherwise. Ray l extending from x in the direction of d will hit another edge of V at point $y_v$ ($y_v:=v_3$ if $(v_3-x)\times d=0$; $y_v \in \{v_1,v_3\}$ if $((v_3-x)\times d)\cdot((v_1-x)\times d) <0$; and $y_v \in \{v_2,v_3\}$ otherwise). The location of $y_v$ can be determined by a simple ray/segment intersection routine.

Having $y_v$, one must determine if $y_v \in W$ (that is, the end of the intersection itself belongs to face W), for then $y:=y_v$. Otherwise, one must determine the edge of W that l first crosses. To do so, compute the barycentric coordinates a:=bary[$y_v$, W] of $y_v$ with respect to W. The barycentric coordinates of a point x with respect to $V=\{v_1,v_2,v_3\}$ is $a=(a_1,a_2,a_3)$=bary(x, V), where the $a_1$, $a_2$, and $a_3$ are defined by ratios of determinants as follows:

$a_1$=Det(x,$v_2,v_3$)/D, $a_2$=Det($v_1$,x,$v_3$)/D, and $a_3$=Det($v_1,v_2$,x)/D, where D=Det($v_1,v_2,v_3$).

If $a=(a_1,a_2,a_3)$ has only one negative component, say $a_1$, then the edge is $\{w_2,w_3\}$. Otherwise, there is only one $a_i$ that is positive, and the edge crossed by l is one of the two edges connecting $w_i$. The edge for which both end points are strictly on one side of l is then eliminated, leaving the final crossed edge. A straightforward ray/segment intersection routine then determines y.

The main procedure for determining the mesh/mesh intersection curve (step 104) is the tracing routine March(). Instead of finding all intersection segments (by separate face/face intersections) between two meshes, and then trying to string the resulting segments along (which could be slow and possibly numerically problematic), the March() routine traces the intersection "curve" (comprising all intersection segments) by marching along it starting from an initial point. Notice the input arguments in FaceXFace(V,x,ind,W) are not symmetric, because the starting point x is on an edge (given by ind) of V. In other words, a distinction is made between the "primary" face (here V) and the "secondary" face (here W). An intersection segment starting from an edge of the current primary face may next end on an edge of the current secondary face. When this happens, one has to swap the roles of primary and secondary faces in the next invocation of FaceXFace(). Thus, the FaceXFace() procedure carefully calculates and stores the positional information (int[2], . . . int[5]) of the end point y.

March(m, f, $x_0$, ind, n, g) outputs a chain of intersection segments starting at $x_0$ and ending either at a boundary of one of the meshes, or back at $x_0$. Inputs m and n are mesh numbers for the two meshes being intersected. Inputs f and g are faces of meshes m and n respectively, and $x_0$ is the starting point, on an edge with index ind on face f.

The following pseudo-code algorithm describes the March() routine, again assuming a regular case as an input, that is, an edge of face f piercing through face g in its interior. The actual code should contain preliminary checks to handle special inputs, to guard against cases where no advance in marching is possible given those inputs. These situations can also occur in the middle of the tracing, so the pseudo-code below contains their resolutions which are described here. One such case is where $x_0$ is a vertex of f, and f and g intersect only at this point, as shown in FIGS. 13E, 13I, and 13M, for example. In such cases, one must change f to an appropriate face of mesh m out of all faces of mesh m sharing that vertex, by calling routine PickAFace().

PickAFace(pri,vert,prif,secf) searches through all faces of mesh pri that share the vertex vert and finds the first one (other than the current prif) that will intersect secf in a segment. The procedure returns Null if no such face is found (for example, when vert is the end of the chain of intersection segments).

Another such special situation case is where $x_0$ is on an edge of f and on an edge of g, and the two faces intersect only at $x_0$, as shown in FIG. 13N. One must then switch input f to one of its neighboring faces sharing the edge containing $x_0$, using NextFace() (described above).

March(m, f, $x_0$, ind, n, g)
   x:=$x_0$;
   pri:=m; sec:=n; (primary and secondary meshes)
   prif:=f; secf:=g (primary and secondary faces)
   result:={{$x_0$, prif, secf}}; (see remark 1 below)
   While (True),
      int:=FaceXFace (prif,x, ind, secf);
      x:=int[1];
      If pri≠m, (if a previous swap occurred)
         {prif, secf}:={secf, prif}; (faces are swapped)
      Append {x, prif, secf} to result;
      If x=$x_0$, Return (result); (see remark 2)
      If ((a:=int[2])≠Null and (b=int[4])≠Null),
         If BoundaryEdgeQ(pri, a) or BoundaryEdgeQ(sec, b),
      Return (result)
        Else
           prif:=NextFace (pri, prif, a),
           ind:=Index (prif,a)
           (finds index of edge a of prif)
         secf:=NextFace(sec,secf,b);
      Else
         If (int[2]=Null but (b:=int[4])≠Null), (x on edge of secf)
           If BoundaryEdgeQ(sec,b), Return(result);
           h:=Nextface(sec,secf,b);
           ind:=Index(h,b);
           {pri,sec}:={sec,pri};
           secf:=prif; prif:=h;
      Else
         If ((a:=int[2])≠Null but int[4]=Null), (x on edge of prif)
           If BoundaryEdgeQ pri,a), Return(result);
           prif:=NextFace(pri,prif,a);
           ind:=Index(prif,a);
      If (int[3]≠Null),
         vert:=vertex of prif given by int[3];
         prif:=PickAFace(pri,vert,prif,secf);
         If prif=Null, Return (result);
         vindex:=Index(prif,vert);
         ind:=Mod(vindex,3)+1; (see Remark 3)
      Else If (int[5]≠Null),
         vert:=vertex of secf given by int[5];
         h:=PickAFace(sec,vert,secf,prif);
         If h=Null, Return (result);
         {pri,sec}:={sec,pri};
         prif:=h;
         vindex:=Index (prif,vert)
         ind:=Mod(vindex,3)+1;

Remark 1: The intersection segments are given in terms of the end points together with the respective faces containing them. These face numbers are needed in future procedures.

Remark 2: The test x=$x_0$ can be within some pre-specified tolerance, so that in Return(result), the last point x is reset if necessary to $x_0$, to avoid problems of slight mismatch of the beginning and end of the intersection curve.

Remark 3: Vindex is the index of vert; so the indices of the two edges containing vert are Mod(vindex,3)±1.

The March() tracing procedure can be encapsulated into a Trace() procedure, having the following syntax: Trace(m, f, $x_0$, ind, n, g), which uses March() to march from f, $x_0$, and ind. The trace may end back at $x_0$ (in which case the tracing is completed) or at the boundary. If the trace ends at the boundary, and if $x_0$ is not on the boundary, there is another portion of the curve to be traced. The procedure then finds the face neighboring f on which $x_0$ lies and the index of the original edge with respect to this face, and the routine then marches from face, $x_0$, index to the boundary. The same g is used if f and g intersect in the regular manner; otherwise, a new g is first found by the method described above, using NextFace() or PickAFace(). After the further tracing is accomplished, the reversal of the new trace is appended to the first trace.

To begin tracing, user interaction can be used. With two meshes to be intersected shown on a display, the user can point to a location near their intersection, and an interface procedure can determine a small family of edges segs from mesh m and a small family of faces fam from mesh n that overlap a certain min-max box (the size of which can be program or user controlled). A simple segment/face intersection routine can then be used to find the first intersection $x_0$ between an edge in segs and a face g in fam. Let f be any of the (at most two) faces bordering edge and ind:=Index (f,edge). Trace (m, f, $x_0$, ind, n, g) then computes an entire chain of intersection segments from $x_0$. If the meshes intersect in two or more curves, the user can then indicate a point near which a second intersection curve lies, to start a new trace.

The tracing of an intersection by Trace() is robust. The only situation that is somewhat difficult to handle is when some face of mesh 1 partially coincides with some face of mesh 2 (this happens if their two normals are parallel: FaceXFace() can be made to detect this and return a message in this case). It is relatively straightforward to determine the region of overlap of the two faces. There are a number of ways to handle the special case, depending upon desired results. This special case should be relatively rare, except when designed. If the special case occurs, the user can remove it by translating or rotating one mesh by a slight amount (step 102 of FIG. 4).

Tessellation of Intersected Faces

Once the intersection curve has been determined through both separate meshes, the faces of each mesh through which the intersection curve passes must themselves in general be tesselated. Here the faces incident the intersection curve are triangulated.

The intersection trace on each face f can be of two types. First, and typically, the trace will contain one or more disjoint polygonal curves (the intersection may pass through f, then through other faces, and then possibly back through f, for example). Such intersection curves are the "cross-cut" type. More rarely, the intersection curve may also contain one or more loops within the same face. These are "interior loops". None of these curves should intersect each other in the interior of f.

Each face (triangle) that is passed through by the intersection curve must be first split by these cross-cuts or interior loops into two or more simple polygons before each such polygon can be triangulated. (A "simple polygon" means a planar polygon whose boundary does not self intersect.) Before this split, all the cross-cuts and interior loops that belong to a face must be first identified. A re-grouping procedure can be performed on the output of Trace() such that, for each mesh m, it results in a list each element of which is of the form {{f, Xsegs, Loops}, ... } where Xsegs={{$v_1, \ldots, v_p$}, ...} and Loops={{$W_1, \ldots, w_q$}, ...} are lists of cross-cuts and interior loops in f, respectively. Here {$v_1, \ldots, v_p$} is one such cross-cut, {$v_1,v_2$}, ..., {$v_{p-1},v_p$} being the intersection segments, with $v_1$ and $v_p$ on the boundary of f. Similarly, {$w_1,w_2$}, ..., {$w_q,w_{q-1}$} (with $w_1=w_q$) denote the segments comprising one interior loop in f. Furthermore, the computed intersection points need to be considered as new vertices for mesh m (even though some may coincide with existing vertices). Thus these points should be appended to the point list p[m]. This is discussed further below in the description of Boolean operations.

The face splitting procedure Split(poly, Xsegs, Loops) consists of two components: SplitX(poly, Xsegs) and SplitI (poly, Loops), the first of which is described in detail. Splito recursively splits off polygons, so that the input poly can be any simple polygon, not just a triangle. SplitX(poly, Xsegs) splits those faces f of mesh m that are intersected by cross-cuts. In the pseudo-code given below for SplitX(poly, Xsegs), poly is represented by {$v_1, \ldots, V_k$}, where $v_k \neq v_1$ (i.e., the last edge is {$v_k,v_1$}). Xsegs is a list of cross-cuts segs each of which start and end on edges of poly. Note that different segs do not cross each other in the interior of poly. The output of SplitX() is a list of new polygons (not necessarily triangles) which together comprise poly, each having no cross-cuts segs in its interior. Each of the new polygons will have the same orientation as that of poly, as defined by the listing of its vertices.

The following is the pseudo-code of the SplitX() algorithm, with special cases and their handling noted separately in the remarks.

SplitX(poly, Xsegs)
  If Xsegs is empty, Return(poly);
  P:=all end points of segs ∈ Xsegs;
  side:={$v_i,v_{i+1}$ }, the first side of poly that contains points of P (1≦i≦k);
    start:=the point in both P and side which is closest to $v_i$;
    border:=the seqs* in Xsegs that has an endpoint equal to start; (see remark 1 below);
    end:=the other endpoint of border;
    If the first point of the polyline segs*=end,
      border:=Reverse(border); (see remark 1 below);
    Xsegs:=Xsegs with segs* removed
    Find j so that end is in the side {$v_j,v_{j+1}$ };(note j≧i)
    i1:=i;
    If (i<k) i2:=i+1 Else i2:=1;
    If (j<k) j1:=j+1 Else j1:=1;
    j2:=j;
    If (ji>i1)
      poly1:=Join(border, {$v_{j1}, \ldots, v_k$}, {$v_1, \ldots, v_{i1}$}) (the most frequent case)
    Else poly1:=Join (border, {$v_{j1}, \ldots, v_{i1}$});
      (happens when j=k)
    If (start end)
      poly2:=Reverse(border) with last point deleted;
        (relatively rare case)
    Else If (i=j=k)
      Poly2:=Reverse (border);
        (relatively rare case)
    Else poly2:=Join(Reverse(border),
        {$v_{i2}, \ldots, v_{j2}$}) (the most frequent case, see remark 2);
    Xsegs1:=those segs in Xsegs having endpoints on edges of poly1; (see remark 3)
    Xsegs2:=the rest of Xsegs;
    Return (Join(SplitX(poly1, Xsegs1), SplitX(poly2, Xsegs2))) (which is a recursive call, in cases where there are several segs in Xsegs).

Remark 1: If there are several segs with the same start, one needs to sort them (by angle at start) so that the "leftmost" segs is chosen as border. The same consideration applies when start=end, in which case one may need to reverse border so that the first segment of border is "to the left" of the last segment of border, else the orientations of the split polygons will not agree with that of the input poly. (Reverse({$x_1, \ldots, x_r$}) is simply {$x_r, \ldots, x_1$}).

Remark 2: Here if i2>j2, the list {$v_{i2}, \ldots, v_{j2}$} to be joined is considered empty.

Remark 3: Xsegs1 is the list of all cross-cuts associated with poly1 to be passed in the recursive call of SplitX(). Note that, in forming Xsegs1, if there are other segs that have an endpoint start, such segs should not be included in Xsegs1, but rather in Xsegs2. This relates to Remark 1.

Remark 4. Three very special cases, for clarity not included in the pseudo-code, which require some handling are: (a) If start=$v_1$, then the last point of poly1 must be deleted; (b) If start=$v_2$, then i2 should be reset to i2+1; (c) If end=$v_{j1}$, then j1 should be reset to j1+1.

SplitI(poly,Loops) functions as follows. For each loop in Loops consists of only one loop, a "branch cut" is introduced from a suitable vertex of poly to a suitable vertex of loop. This in effect cancels the loop. (See the last paragraph of this subsection.) This cut should be carefully chosen such that it does not intersect any other edges of either the poly or the loop. Recursion then cancels all loops.

Figure 14A:
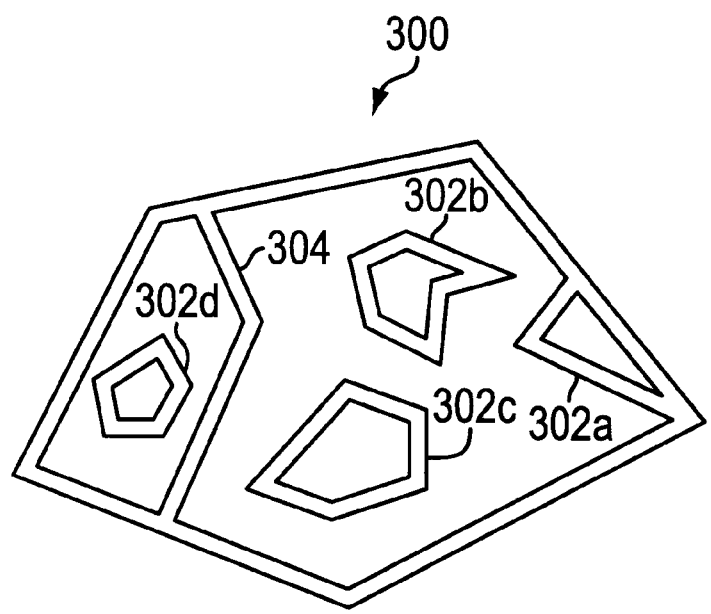
FIGS. 14A through 14C are schematic representations of triangulations of a polygon having inner loops and crosscuts.
Figure 14B:
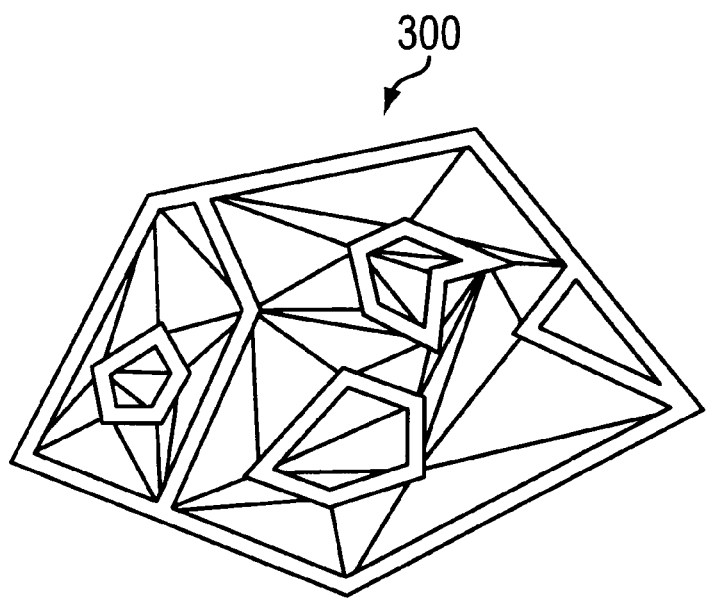
Figure 14C:
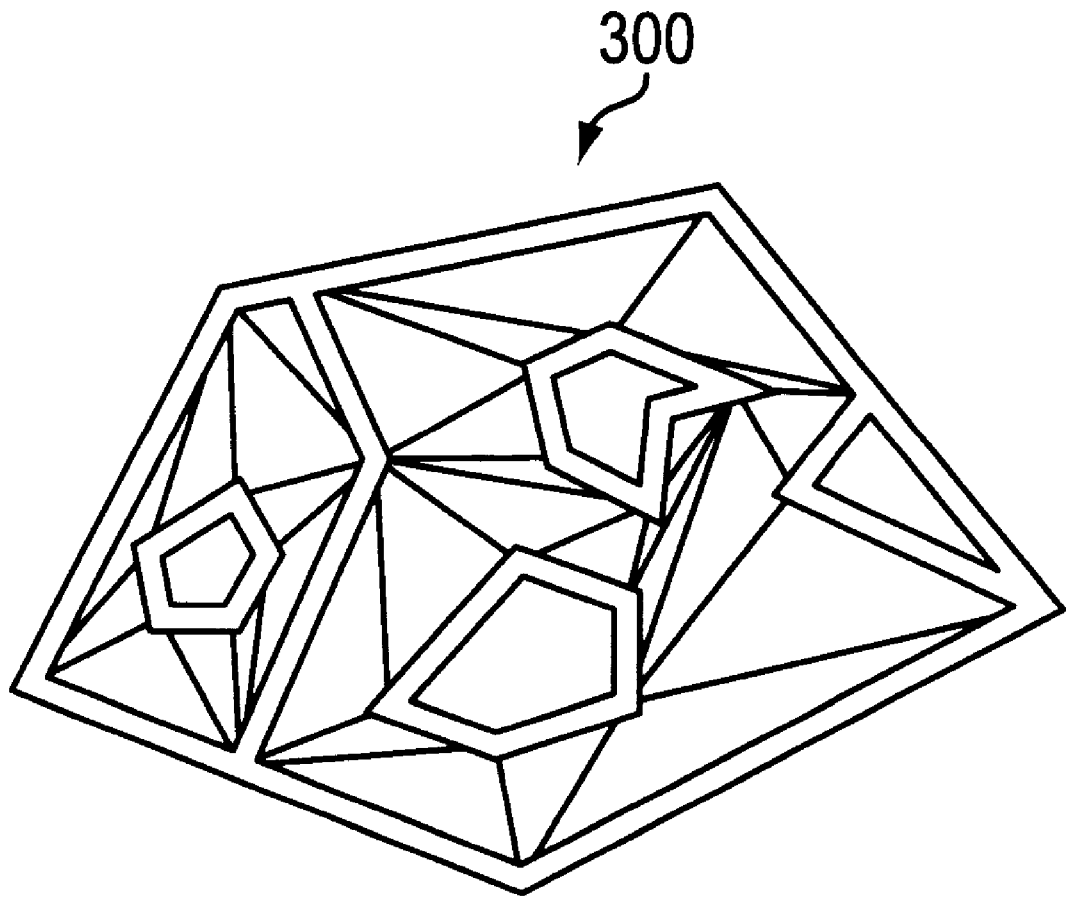

FIG. 14A shows a pentagon with two cross-cuts (302a, 302e) and three interior loops (302b through d). The split() procedure splits it into six polygons, each of which will be triangulated. FIG. 14B shows the results of the triangulation. Note that the new edges resulting from the triangulations do not intersect the cross-cuts or the loops. This is the purpose of the splitting algorithm. In FIG. 14C, triangles inside the three loops are deleted.

To summarize the tessellation (here, triangularization) procedure so far, the intersection curve result of Trace() is re-grouped according to each face. For each mesh m, this gives a listing of {f,Xsegs,Loops}, where f is a face of mesh m incident to the intersection curve, and Xsegs and Loops are the lists of all cross-cuts and interior loops that belong to f. Split(f,Xsegs,Loops) then splits off all constituent polygons of each face f as delineated by the intersection. These polygons are then triangulated into new triangular faces, as described below; the resulting triangles are given in terms of vertex numbers (therefore, the p[m] lists have been extended with new vertices resulting from the intersection curve).

A relatively simple algorithm exists for triangulating a simple polygon. See, S. Wagon, Mathematica in Action, W. H. Freeman, NY (1991), pp. 337–341 or J. O'Rourke, *Computational Geometry in C*, Cambridge University Press, NY (1994), Chapter 1. The polygon is recursively split into two via an interior diagonal, connecting two non-consecutive vertices. A diagonal is said to be interior if, except for its two endpoints, it lies in the interior of the polygon. To find an interior diagonal, let v be a convex vertex, in the sense that if u, v, and w are consecutive vertices, then the interior angle at v is less than 180°. For example, take the left-most vertex, or when tied, take the bottom-most vertex. If no other vertices lie inside or on the triangle {u,v,w}, then {u,w} is an interior diagonal; otherwise choose from those vertices that lie inside or on {u,v,w} a vertex x that is farthest from the {u,w}, then {u,x} is an interior diagonal.

This particular algorithm can be a bit slow for polygons with large numbers of sides. However, for present purpose, the polygons generated by intersecting two meshes generally have a relatively small number of sides, (being those split off from a triangle by generally a single cross-cut consisting of just a few segments), so that a simple procedure can be quite suitable. In practice, relatively few occurrences as complex as in FIGS. 14A through 14C should occur.

It should also be noted that splitting a triangle with an interior loop does not, strictly speaking, result in two simple polygons; one of them has two edges coinciding since it is created by the branch cut. This polygon is a limiting case of simple polygons, and the same triangulation procedure can also apply, with some obvious modifications in coding.

Face Deletions

After all the faces that are intersected by the intersection curve have been suitably tesselated (here, triangulated), appropriate faces are deleted. For such deletions, it should be assumed that each mesh is consistently oriented. For purposes of face deletion, a chain is defined as a list of directed edges given in terms of the vertex numbers, e.g., {{3,4},{4,8}, . . . ,{16,2}}. A face, e.g., {5,3,4}, is defined as "immediately to the left of" the above chain if it both borders an edge of the chain (e.g., edge {3,4}) and is traversed in the same direction as that edge. Generally a face is "to the left of" a chain if there is a sequence of compatibly oriented faces, starting with face and ending with a face immediately to the left of the chain. Note that faces to the right of the chain are the faces to the left of the reverse chain. (The reversal of the example chain above is simply the new chain {{2,16}, . . . ,{8,4}, {4,3}}).

The procedure LayerOnLeft(m, chain) identifies those faces (the "first layer of faces") of mesh m immediately to the left of chain. It returns a list Lfacelist of faces and a newchain to be used for the next invocation of LayerOnLeft (). A procedure FacesOnLeft(m,chain) repeatedly applies LayerOnLeft() until newchain is Null, and thereby removes all faces to the left of chain. To remove all faces to the right of chain, one can simply reverse chain as noted above, and perform FacesOnLeft() on the reversed chain.

Some notations are used in the following pseudo-code algorithm listing. If chain={{2,5},{5,8}, . . . , {11,9},{9,7}}, then First(chain)={2,5}, Last(chain)={9,7}, and the Reverse of edge {2,5} is {5,2}. Drop(chain,1) gives the chain {{5,8}, . . . , {11,9},{9,7}}, while Drop(chain, −1) gives the chain {{2,5},{5,8}, . . . , {11,9}}. These, as well as Append and Join, all have their usual list processing meanings. Also, if for example face={3,6,9} is to the left of edge={6,9}, then the other vertex 3 is called the "Mid" of face with respect to edge.

Except for finding the neighboring face to the left of an edge (which is relatively straightforward using the described data structures), the FacesOnLeft() procedure is entirely list processing.

LayerOnLeft(m, chain)
  newchain:={}; Lfacelist:={};
  Go through every edge of chain:
    If newchain≠{},
      If edge=Reverse(Last(newchain)), newchain:=
        Drop(newchain,−1);
      Else If edge=Reverse(First(newchain)),
        newchain:=Drop(newchain, 1);
    Find the neighboring face of mesh m to the left of edge;
    If face={}, edgelist:={};
    Else if face is in Lfacelist,
      face:={}; edgelist:={edge};
    Else (with edge={i,j} and mid=Mid of face with
      respect to edge)
      edgelist:={{I, mid}, {mid, j}};
    If newchain≠{} and edgelist≠{} and First(edgelist)=
      Reverse(Last(newchain)),
      newchain:=Join(Drop(newchain,−1),Drop(edgelist,
        1));
    Else
      newchain:=Join(newchain,edgelist);
    If face≠{},
      Lfacelist:=Append(Lfacelist, face);
    Repeatedly scan the resulting newchain for cancellations:
      that is, replace newchain of the form {edges1, {p,q},
        edges2, {q,p}, edges3} by {edges2, edges1,
        edges3}
    Return Lfacelist and newchain.

Figure 15A:
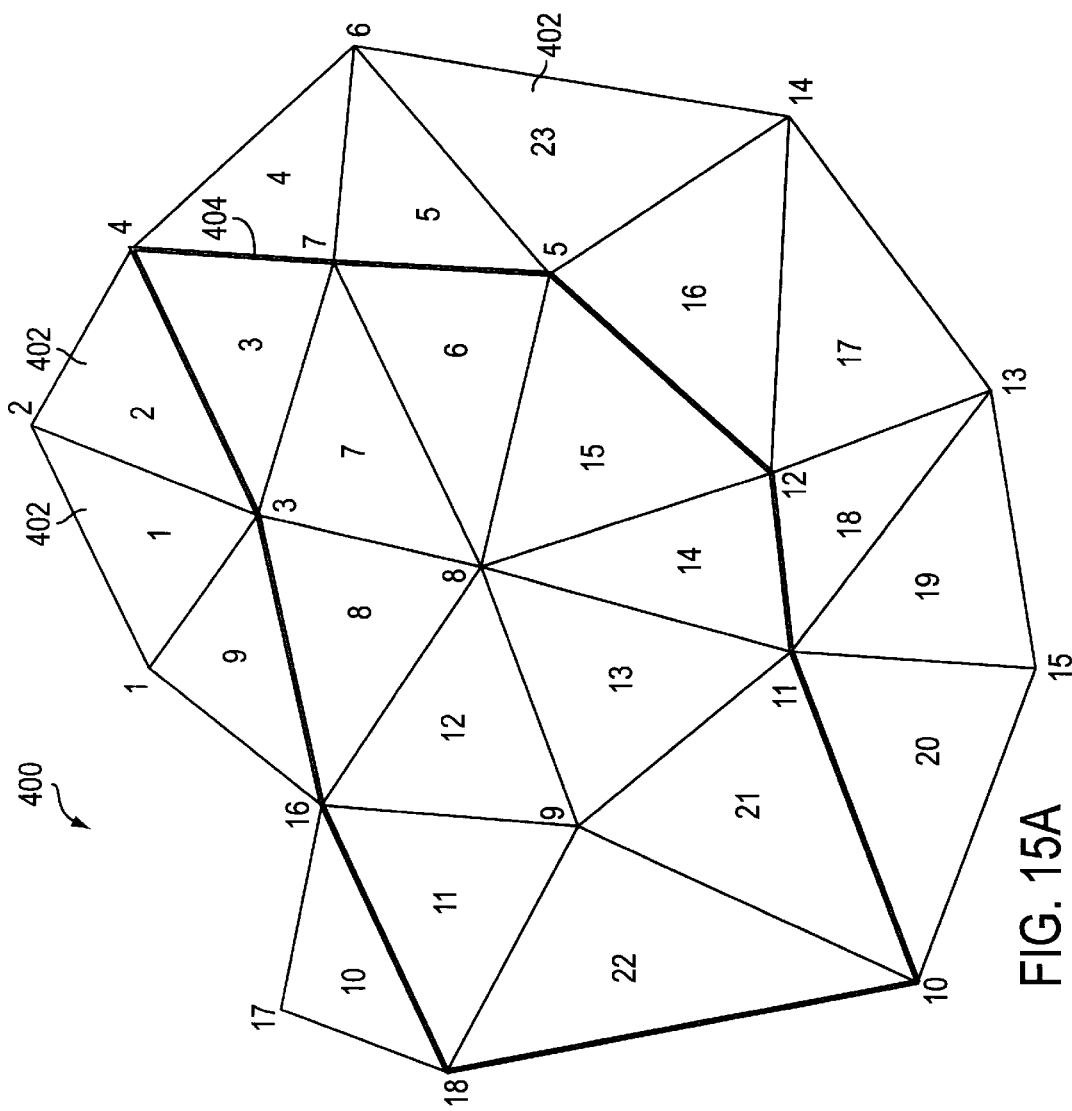
FIGS. 15A through 15D are schematic diagrams of a subdivision mesh revealing a face removal operation.
Figure 15B:
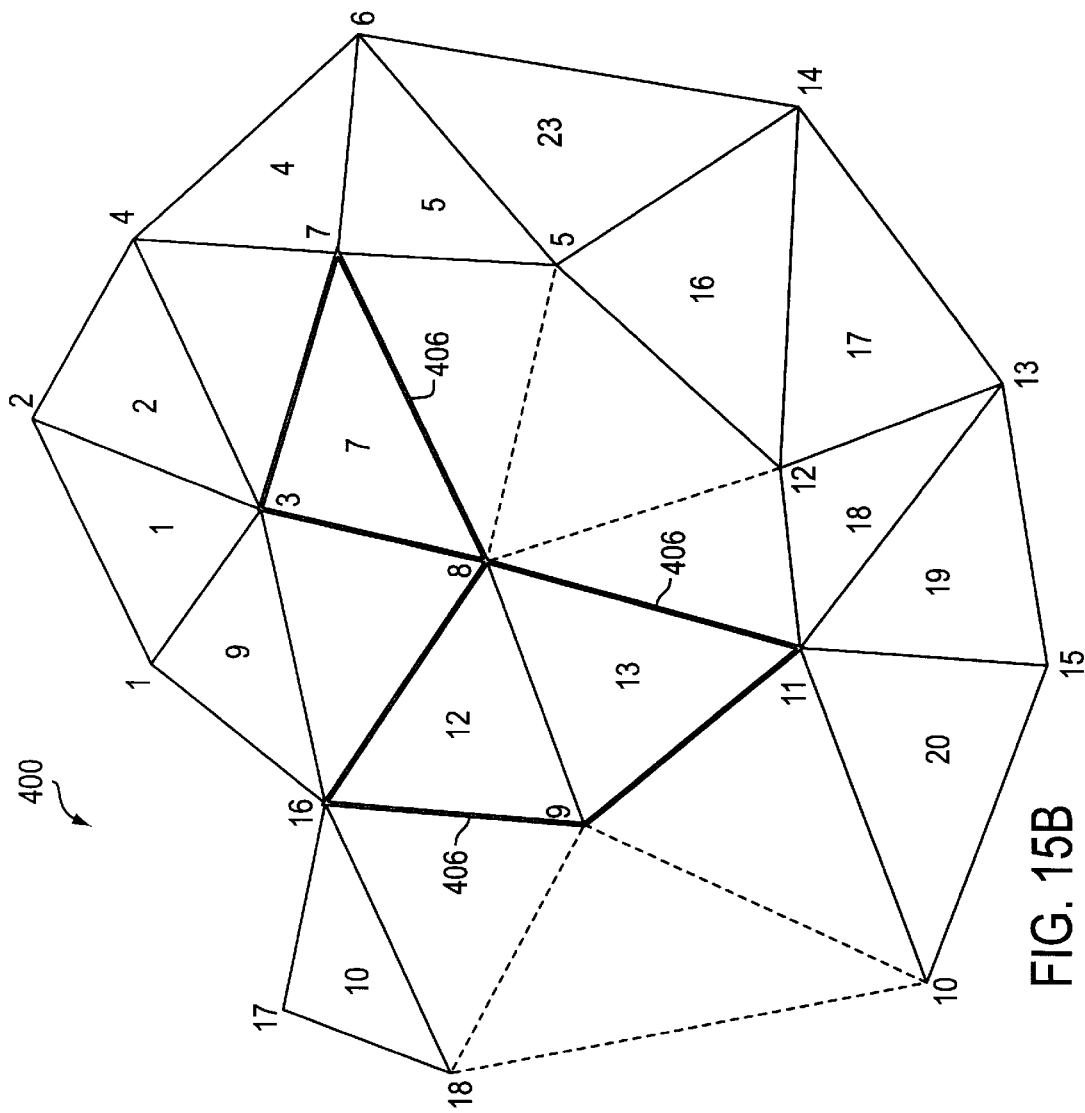
Figure 15C:
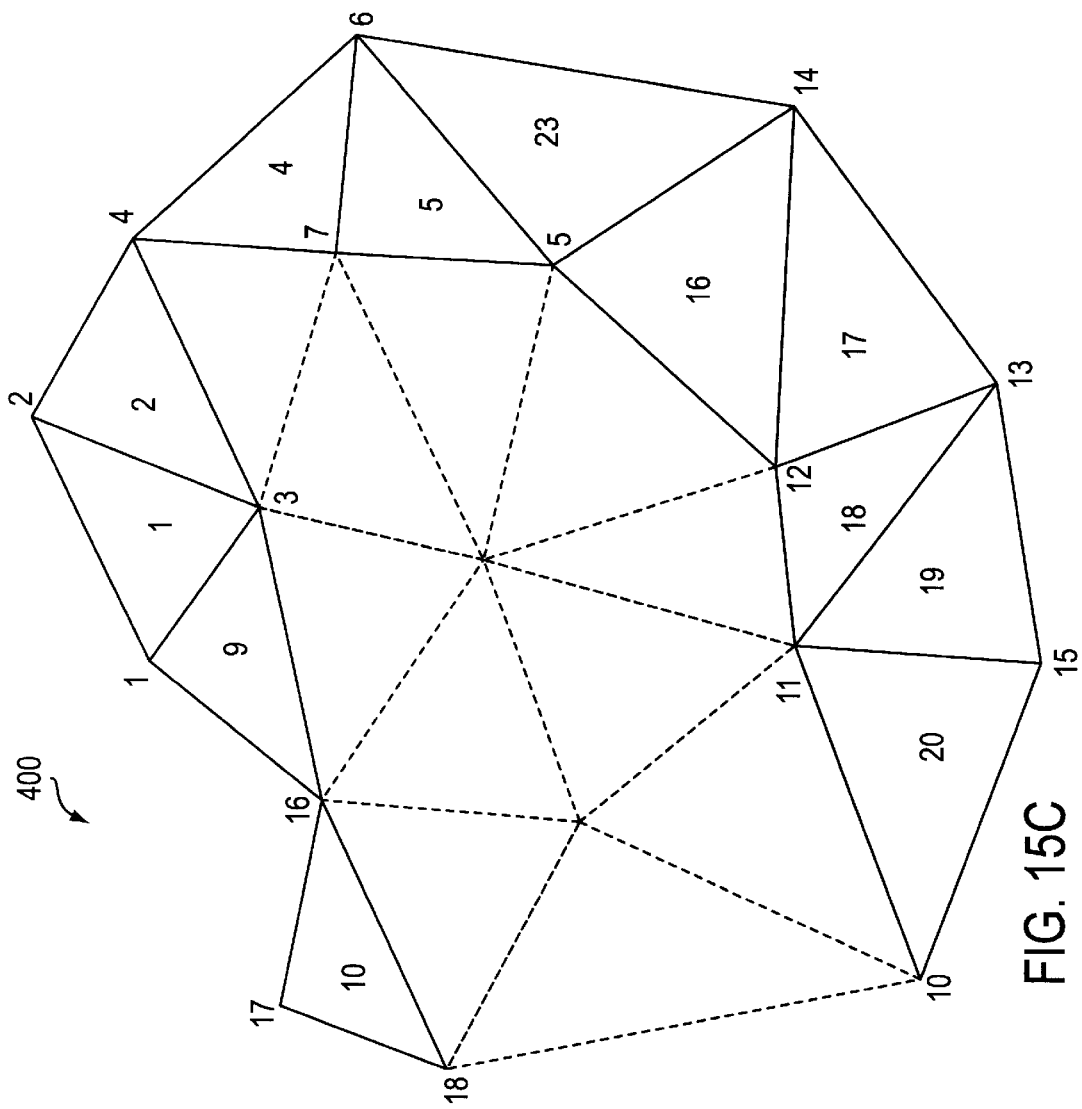
Figure 15D:
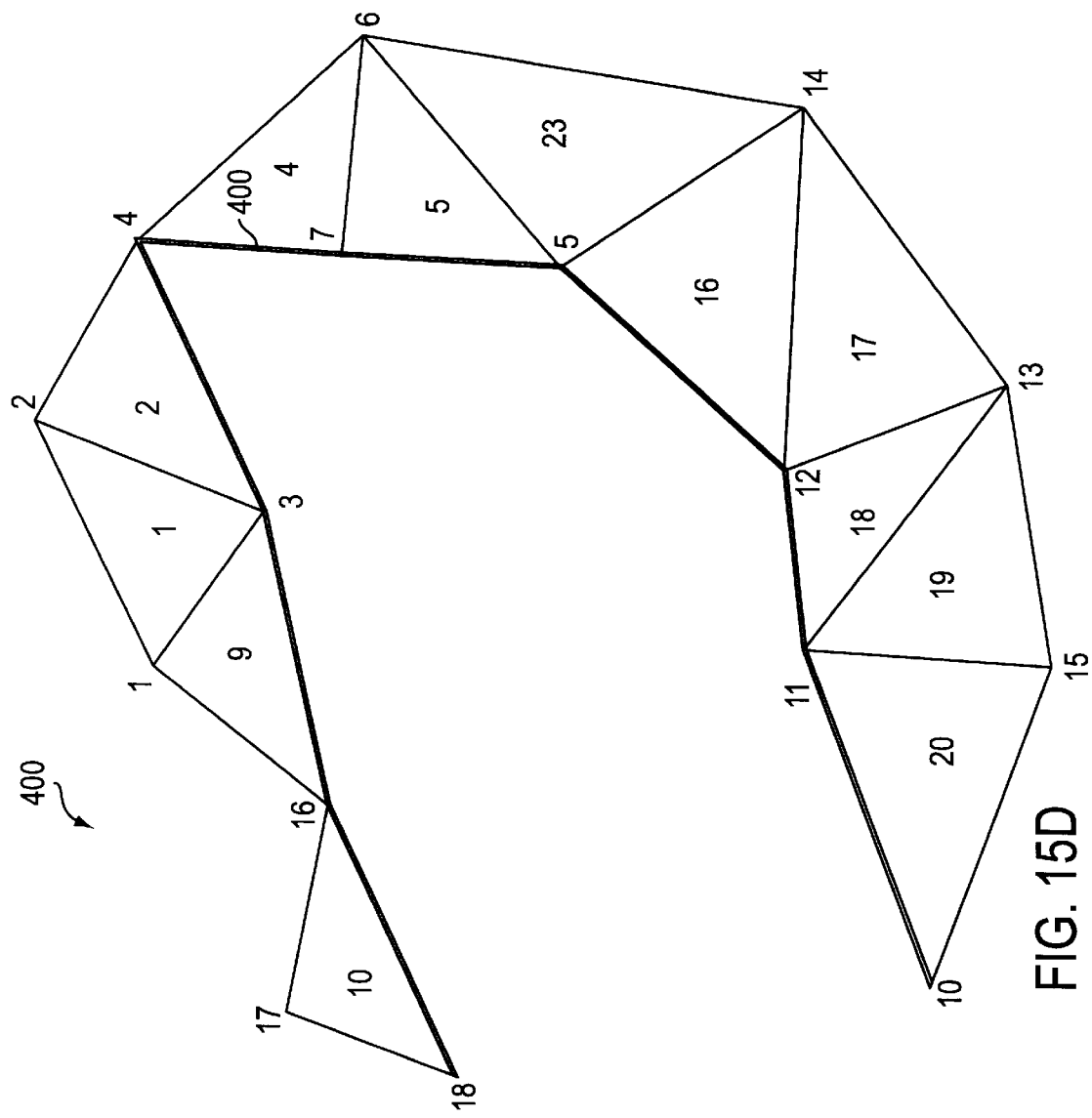

A simple example of face removal is shown in FIGS. 15A through 15D. Mesh 400 is the same mesh used in FIG. 12, with face numbers indicated at the centers of the faces. Heavy line 404 denotes an intersection curve chain, all faces within which are to be removed. The orientation of the chain is assumed to be counter-clockwise. A first application of LayerOnLeft() identifies and removes eight faces. These are the triangles shown with edges dotted and without face numbers. The resulting new chain is shown as curve chain 406 surrounding the remaining inner faces (here, faces 7, 12, and 13) (FIG. 15B). A second application of LayerOnLeft() removes the remaining faces to the left of new chain 406, leaving no inner faces and no further chain (FIG. 15C). FIG. 15D shows the resulting mesh having no faces within the original chain 404.

In more complicated examples, the resulting mesh may even be disconnected. This does not affect the Boolean operations described below, which follow face removal. Also, at some intermediate stage, the new chain may also consist of several disconnected loops, but this is no problem, as the pseudo-code algorithm has already taken care of this.

In LayerOnLeft() described above, the neighboring faces (one or two) of each edge of the chain is immediately read from the existing data structures, and picking the face to the left of the edge is straightforward. However, note that new vertices are generated by the intersection curve, and new faces and edges are created by triangulation. These new vertices, edges, and faces are generally not in the original data structure. Thus face deletion should can be done in two stages. Alternative versions of the above routines LayerOnLeft(family, chain) and FacesOnLeft(family, chain) can operate upon an unstructured family of faces. The only difference between these alternative versions and the previous ones is that, in LayerOnLeft(family, chain), the neighbors of a given edge of chain are obtained by a brute-force search through family. This might appear unsatisfactory. However, family is generally a much smaller set of faces than the entire mesh, so this is generally quite acceptable, and compares favorably with reorganizing the entire data structures of both meshes after intersection and before face deletions. The alternative version of FacesOnLeft(family, chain) ends when there are no more faces in family to the left of chain, and returns the final updated (shrunk) chain newchain, which is a boundary chain of family. Thus, the rest of the faces to be removed from mesh m can then be found by a call to the first (structured) version of FacesOnLeft(m, newchain).

Boolean Operations

Boolean operations upon the two base meshes can be performed using the procedures set forth above. Let mesh 1 and mesh 2 intersect in a single connected polygonal curve I. The general case (I consisting of several such connected components) can be built up from the basic case. If I is assigned an orientation along its path, the curve with the opposite orientation can be denoted by −I. There are two basic types of Boolean results for the surfaces, Subtraction (or Removal) and Addition (or Join).

Subtraction, or removal, can be denoted by Rem(1,I) which provides the remainder of mesh 1 after removal of the part to the left of I. Removing the part of mesh 1 to the right of I is Rem(1,−I).

Addition, or joining, can be denoted by Join(1,I;2,J) which is equivalent to Rem(1,I)∪ Rem(2,J) where J=I or −I.

Subtraction or Removal—Rem(1,I)

Let mesh 1 have vertex list $P_1$, with $N_1$ points, and face list $F_1$. The intersection with mesh 2 gives a list $K_1$ of new vertices, numbered from $N_1+1$ to $N_2$, as well as the list G of faces of $F_1$ traced through by the intersection curve. Append $K_1$ to $P_1$, and delete G from $F_1$. Let H be the list of new faces obtained from tessellations (here, triangulations) on G.

Let chain be the directed chain of intersection segments (where each segment is an ordered pair of vertex numbers ranging from $N_1+1$ to $N_2$). This chain (together with the original mesh) can be displayed to the user on a computer display, with its direction shown by arrows or other means. The user can then decide which side of the chain is to be removed, either by a pointing device or by keyboard input. If the side is not on the left of the directed chain, the chain is reversed. Then FacesOnLeft() finds all faces to the left of chain, first from H, then from $F_1$. These faces are then removed, and the remainder of H is appended to the remainder of $F_1$, resulting in a new face list $F_1$.

The results can then be cleaned up. A certain number of vertices may now be redundant, if all faces containing these vertices have been removed. A list gaps of vertex numbers of these points can be obtained as the complement of the vertex numbers in the new $F_1$ from $\{1, \ldots, N_2\}$. The corresponding vertices are deleted from $P_1$, resulting in a final $P_1$. Since faces are expressed as ordered triples of vertex numbers, the faces should also then be renumbered in terms of the new vertex numbers of the new $P_1$. A routine CleanUp($F_1$, gaps) can perform this straightforward renumbering. The result is the final $F_1$, which together with the final $P_1$ define Rem(1,I).

Addition or Joining—Join(1,I;2,J), J=I or −I

To join two meshes, one starts with the results of the subtraction (or removal) steps, where $P_1$, $F_1$, $K_1$, gaps1, and $P_2$, $F_2$, $K_2$, gaps2 are the results of Rem(1,I) and Rem(2,J), being the removal of unwanted triangles from base meshes 1 and 2, on selected sides of intersection curve I. At this stage here, though, for a joining operation, the respective sets of faces and vertices should not have been cleaned up yet. That is, redundant vertices in $P_i$ have not have been removed and Cleanup() has not have been applied to the faces, although the gaps in vertices have been determined. Given $N_1$ and $N_2$ as before, let $P_2$ be numbered from 1 to $L_2$, with vertices numbered $L_1+1$ to $L_2$ being the new points of intersections $K_2$ ($L_2-L_1=N_2-N_1$). Furthermore, if J=I, then each face triple in $F_2$ should be reversed, in order that the join of the two meshes will give a single consistently oriented mesh.

The vertices in $P_2$, numbered 1 to $L_1$ (the original vertices of mesh 2) are appended to $P_1$, giving the vertex list P. All point numbers in $F_2$ must therefore be increased by $N_2$. $K_2$ now has vertices numbered from $N_2+L_1+1$ to $N_2+L_2$. They are the same points as in $K_1$ (i.e. the numbers $N_1+1$ to $N_2$), but with a shifted ordering. The regrouping procedure described above in the Tessellations section, when applied to mesh 2, tends to shift this order, since for purposes of tessellation the intersection points are grouped to start from an edge of each face, unless there are no cross cuts. Even though points in $K_2$ have not been appended, their numbering can affect the specification of faces in $F_2$, since vertices of faces in $F_2$ are numbered from $N_2+1$ to $N_2+L_2$, even though P has $N_2+L_1$ points. A correspondence rule therefore can be established, providing a mapping from $[N_2+L_1+1, N_2+L_2]$ to $[N_1+1, N_2]$. The new $F_2$, after renumbering by this rule, is then appended to $F_1$ to give the final F.

Lastly, gaps2 should also be increased by $N_2$, then joined with gaps1, to form the final gaps list. The corresponding vertices are deleted to give the final and shortened P. The renumbering routine CleanUp(F,gaps) again yields the final face list F, such that P and F together define Join(1,I;2,J). This new mesh should be already consistently oriented. Optionally, the data structure for this mesh can be constructed so that the cleanup step is not needed when the mesh is re-used.

Implementation of Procedures

Figure 16:
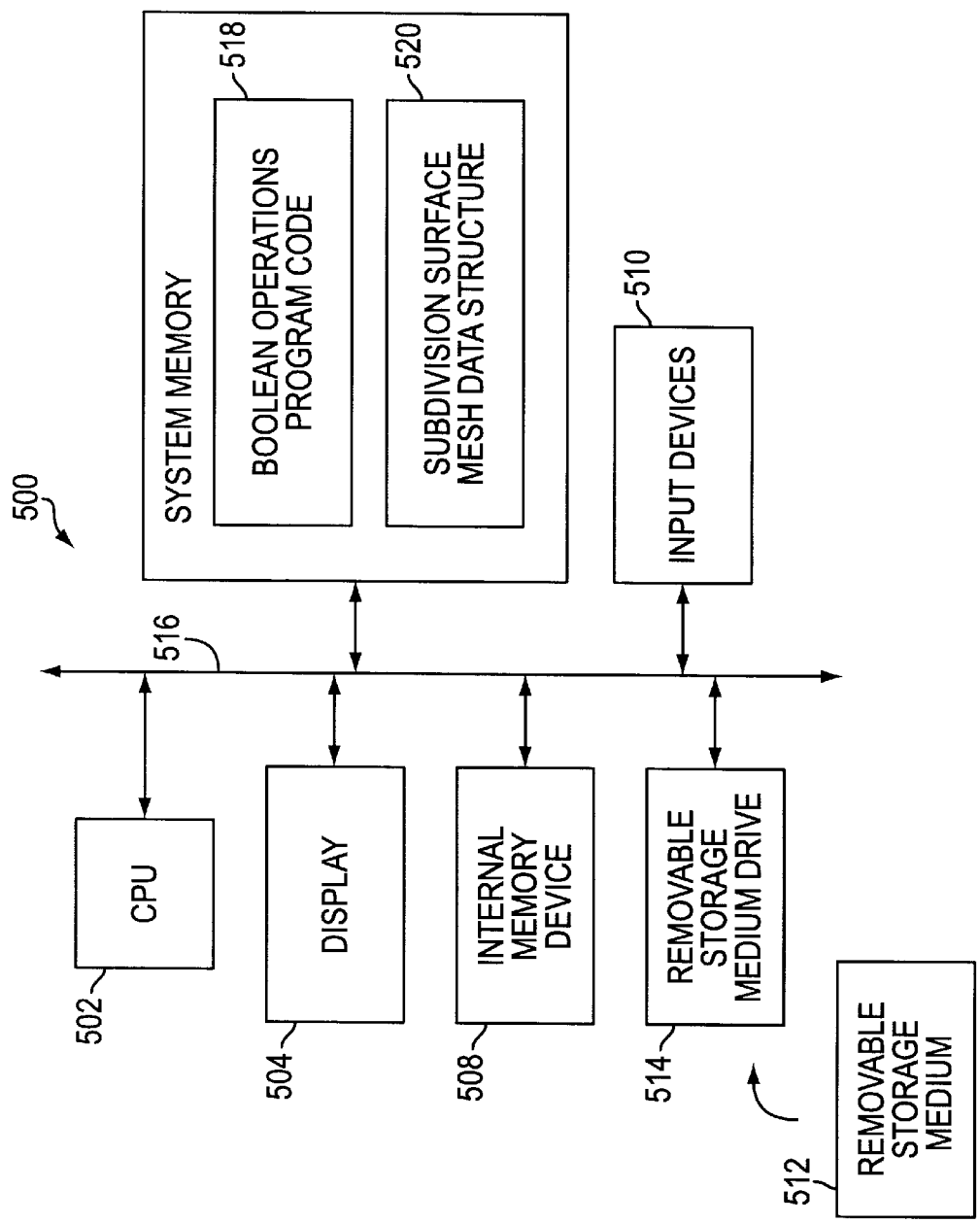
FIG. 16 is a schematic drawing of a computer system for use with a Boolean operation method for subdivision surfaces.

The techniques described above can be implemented in special-purpose circuitry, general-purpose circuitry (such as programmable microprocessors) operating under the control of program instructions, or in any combination of such apparatus. However, the techniques are not limited to any particular circuitry or program configuration; they can find applicability in any computing or processing environment that can be used for the manipulation of meshes used for constructing surfaces of objects. Referring to FIG. 16, the techniques can be implemented in computer programs executing on programmable circuitry that can include a processor, a storage medium readable by the processor (including volatile or non-volatile memory and/or storage elements), one or more input device, and one or more output devices. Program code can be applied to data entered using the input device to perform the functions described and to generate output information. The output information can be applied to the one or more output devices.

Referring to FIG. 16, a computer system 500 for performing Boolean operations includes a CPU 502, a display 504, a system memory 506, an internal memory device (e.g., hard disk drive) 508, a user input device(s) 510 (e.g., keyboard and mouse), and a removable storage edium 512 (e.g., floppy, tape, or CD-ROM) read by an appropriate drive 514, all coupled by one or more bus lines 516. A Boolean operations program 518 can be stored on removable storage medium 512, and then introduced to computer system 500 through drive 514 to be either temporarily stored in system memory 506 or permanently stored in internal memory device 508. CPU 502 then uses the introduced Boolean operations program 518 to perform Boolean operations upon meshes, including generating and using one or more data structures 520 for assisting these operations, substantially as described above.

Each program described above can be implemented in a high level procedural or object oriented programming language to communicate with a computer system. However, the programs can be implemented in assembly or machine language, if desired. In any case, the language can be a compiled or interpreted language.

Each such program can be stored on a storage medium or device (e.g., DVD, CD-ROM, hard disk or magnetic diskette) that is readable by a general or special purpose programmable computer for configuring and operating the computer when the storage medium or device is read by the computer to perform the procedures described in this document. The system can also be considered to be implemented as a computer-readable storage medium, configured with a computer program, where the storage medium so configured causes a computer to operate in a specific and predefined manner.

The present invention has been described in terms of an embodiment. The invention, however, is not limited to the embodiment depicted and described. Rather, the scope of the invention is defined by the claims.

Other embodiments are within the scope of the claims. For example, a number of different types of base meshes can be joined in this manner, including surfaces composed of quad faces. Different procedures can be used, written in a number of different programming languages, and being executed in different orders, to arrive at the same results. While method 100 is described in relation to triangular base meshes, other face shapes (e.g., quads) can be employed, and method 100 can be adjusted accordingly. If, for example, quad faces are used to calculate mesh intersections, the faces incident the intersection curve can be tessellated into new quad-shaped faces.

What is claimed is:

1. A method for performing Boolean operations upon two base meshes using a computer, where each base mesh comprises a plurality of faces, the computer having a processor and a memory, the method comprising:

establishing in the memory a data structure storing data representing the structures of the two base meshes;

determining intersections of the two base meshes, the intersections defining an intersection curve;

tessellating faces incident to the intersection curve;

selecting surviving portions of the intersecting faces;

deleting faces of the two base meshes according to the selected surviving portions; and combining remaining faces of the two base meshes into a resultant base mesh.

2. The method of claim 1 wherein the selecting the surviving portions of the two base meshes is by user input through an input device of the computer.

3. The method of claim 1 wherein the selecting the surviving portions of the two base meshes is automatically calculated by the processor.

4. The method of claim 1 wherein tessellating the faces of the base meshes incident to the intersection curve converts any face having greater than three sides into two or more new faces having only three sides.

5. The method of claim 1 wherein tessellating the faces of the base meshes incident to the intersection curve converts any face having a number of sides different from four into two or more new faces having only four sides.

6. The method of claim 1 further comprising constructing a surface from the resultant base mesh.

7. The method of claim 6 wherein the surface is constructed using subdivision rules.

8. The method of claim 1 further comprising computing a plurality of intersections between intersecting faces of the two base meshes, the plurality of intersections defining a plurality of intersection curves.

9. A computer program, residing on a computer-readable medium, comprising instructions for performing Boolean operations upon two base meshes by causing a computer to:

establish in the memory a data structure storing data representing the structures of the two base meshes;

determine intersections of the two base meshes, the intersections defining an intersection curve;

tessellate faces incident to the intersection curve;

select surviving portions of the intersecting faces;

delete faces of the two base meshes according to the selected surviving portions; and combine remaining faces of the two base meshes into a resultant base mesh.

10. The computer program of claim 9 wherein the selecting the surviving portions of the two base meshes is by user input through an input device of the computer.

11. The computer program of claim 9 wherein the selecting the surviving portions of the two base meshes is automatically calculated by the processor.

12. The computer program of claim 9 wherein tessellating the faces of the base meshes incident to the intersection curve converts any face having greater than three sides into two or more new faces having only three sides.

13. The computer program of claim 9 wherein tessellating the faces of the base meshes incident to the intersection curve converts any face having a number of sides different from four into two or more new faces having only four sides.

14. The computer program of claim 9 further comprising constructing a surface from the resultant base mesh.

15. The computer program of claim 14 wherein the surface is constructed using subdivision rules.

16. The computer program of claim 9 further comprising computing a plurality of intersections between intersecting faces of the two base meshes, the plurality of intersections definging a plurality of intersection curves.

* * * * *

UNITED STATES PATENT AND TRADEMARK OFFICE
CERTIFICATE OF CORRECTION

PATENT NO. : 6,307,555 B1
DATED : October 23, 2001
INVENTOR(S) : Eugene T. Y. Lee It is certified that error appears in the above-identified patent and that said Letters Patent is hereby corrected as shown below:

<u>Title page,</u>
Item [56], under Reference Cited, U.S. PATENT DOCUMENT: change "5,416,729    5/1995" to -- 5,416,729  3/1995 --.

Signed and Sealed this

Twenty-fifth Day of June, 2002

*Attest:*

*Attesting Officer*

JAMES E. ROGAN
*Director of the United States Patent and Trademark Office*